United States Patent
Mizuuchi et al.

(10) Patent No.: US 7,065,035 B1
(45) Date of Patent: Jun. 20, 2006

(54) OPTICAL MULTILAYER DISK, MULTIWAVELENGTH LIGHT SOURCE, AND OPTICAL SYSTEM USING THEM

(75) Inventors: Kiminori Mizuuchi, Osaka (JP); Kazuhisa Yamamoto, Osaka (JP); Rie Kojima, Osaka (JP); Noboru Yamada, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 721 days.

(21) Appl. No.: 09/694,625

(22) Filed: Oct. 23, 2000

(30) Foreign Application Priority Data

Oct. 25, 1999 (JP) .................. 11-302675
Oct. 25, 1999 (JP) .................. 11-302676

(51) Int. Cl.
*G11B 7/24* (2006.01)
(52) U.S. Cl. ............... 369/283; 369/112.27; 369/94; 369/288; 430/270.13
(58) Field of Classification Search ........... 369/283, 369/286, 288, 44.37, 44.12, 112.27; 428/64.1; 430/270.13
See application file for complete search history.

(56) References Cited

U.S. PATENT DOCUMENTS

| 4,318,058 A | * | 3/1982 | Mito et al. .................. 372/50 |
| 4,908,813 A | * | 3/1990 | Ojima et al. ................ 369/94 |
| 5,384,797 A | * | 1/1995 | Welch et al. ................ 372/23 |
| 5,436,757 A | | 7/1995 | Okazaki et al. |
| 5,526,338 A | * | 6/1996 | Hasman et al. ............. 369/94 |
| 5,527,661 A | * | 6/1996 | Akahira et al. ......... 430/270.13 |

(Continued)

FOREIGN PATENT DOCUMENTS

EP   0-319037   6/1989

(Continued)

OTHER PUBLICATIONS

Kubota et al.."Optical Data Storage '98" Proc. SPIE vol. 3401, 1998, pp. 80-86.

(Continued)

*Primary Examiner*—William Kcrzuch
*Assistant Examiner*—Michael V. Battaglia
(74) *Attorney, Agent, or Firm*—Hamre, Schumann, Mueller & Larson, P.C.

(57) ABSTRACT

When a wavelength of a first laser beam with which a first recording medium including a first recording layer is recorded and reproduced is indicated as $\lambda 1$ (nm), a wavelength of a second laser beam with which a second recording medium including a second recording layer is recorded and reproduced as $\lambda 2$ (nm), the relationship between the wavelength $\lambda 1$ and the wavelength $\lambda 2$ is set to be expressed by $10 \leq |\lambda 1 - \lambda 2| \leq 120$. The first recording layer has a light absorptance ratio of at least 1.0 with respect to the wavelength $\lambda 1$. The light transmittance of the first recording medium with respect to the wavelength $\lambda 2$ is set to be at least 30 in both the cases where the recording layer is in a crystal state and in an amorphous state. In order to record and reproduce the optical multilayer disk with the above-mentioned characteristics, a multiwavelength light source with the following configuration is used. Wavelengths of fundamental waves with different wavelengths from injection parts formed at one end of a plurality of optical waveguides, which satisfy phase matching conditions different from one another and are formed in the vicinity of the surface of a substrate, are converted simultaneously, and the first and second laser beams are emitted from emission parts formed at substantially the same position at the other end of the optical waveguides. This enables an optimum optical system for high density recording and reproduction to be obtained.

23 Claims, 14 Drawing Sheets

U.S. PATENT DOCUMENTS

| | | | |
|---|---|---|---|
| 5,555,537 A * | 9/1996 | Imaino et al. | 369/94 |
| 5,726,969 A * | 3/1998 | Moriya et al. | 369/275.1 |
| 5,761,226 A * | 6/1998 | Gupta | 372/22 |
| 5,766,717 A * | 6/1998 | Kaneko et al. | 428/64.1 |
| 5,930,066 A * | 7/1999 | Ishizuka et al. | 360/77.03 |
| 6,030,678 A * | 2/2000 | Aratani | 428/64.1 |
| 6,211,788 B1 * | 4/2001 | Lynn et al. | 340/573.1 |
| 6,221,455 B1 * | 4/2001 | Yasuda et al. | 428/64.1 |
| 6,233,217 B1 | 5/2001 | Yoo et al. | |
| 6,240,060 B1 * | 5/2001 | Kikitsu et al. | 369/275.1 |
| 6,312,780 B1 * | 11/2001 | Kasami et al. | 428/64.1 |
| 6,343,060 B1 * | 1/2002 | Ko | 369/275.1 |
| 6,424,608 B1 * | 7/2002 | Takeuchi | 369/47.53 |

FOREIGN PATENT DOCUMENTS

| | | |
|---|---|---|
| EP | 0 706 178 | 4/1996 |
| EP | 0 766 240 | 4/1997 |
| EP | 0 886 269 | 12/1998 |
| EP | 1 028 421 | 8/2000 |
| EP | 1 172 811 | 1/2002 |
| JP | 6-028712 | 2/1994 |
| JP | 8-1707 | 1/1996 |
| JP | 8-127176 | 5/1996 |
| JP | 10-293942 | 11/1998 |
| JP | 11-86331 | 3/1999 |
| KR | 1999-001893 | 1/1999 |
| WO | 91/12556 | 8/1991 |

OTHER PUBLICATIONS

Kubota et al. "Optical Data Storage '98" Proc. SPIE vol. 3401, 1998, pp. 64-70.

Hiroshi Kutoba "Wave Optics" 1971, pp. 199-236.

* cited by examiner

OPTICAL MULTILAYER DISK, MULTIWAVELENGTH LIGHT SOURCE, AND OPTICAL SYSTEM USING THEM

BACKGROUND OF THE INVENTION

1. Field of the Invention

The present invention relates generally to an optical information recording medium in which information is recorded and reproduced optically with respect to recording layers in a multilayer, i.e. an optical multilayer disk, and to a method of recording and reproducing with respect to the same. The present invention also relates generally to an optical waveguide device, to which a coherent light source is applied, used in fields of optical information processing and optical application instrumentation and further to a multiwavelength light source using such an optical waveguide device and an optical system using such a multiwavelength light source for recording and reproduction of information with respect to the optical multilayer disk.

2. Related Background Art

As a method of increasing capacity and density of an optical information recording medium, a technique of recording using two wavelengths with respect to two recording layers is proposed by H. A. Wierenga in "Phase Change Recording: Options for 10–20 GB (Dual Layer, High NA, and Blue)" (Proc. SPIE. Optical Data Storage '98, 3401, 64–70 (1998)), in which dual-wavelength recordings using wavelengths of 650 nm and 780 nm and wavelengths of 410 nm and 650 nm have been reported based on calculation.

In this case, the spot size w of an incident beam is given by $w=k\lambda/NA$. In the formula, $\lambda$ denotes the wavelength of a laser used, k a constant, and NA a numerical aperture of an objective lens. From this relation, the spot size can be reduced and recording density is increased as the wavelength $\lambda$ of the laser beam is shortened and the numerical aperture NA of the lens is increased.

FIG. 11 is a schematic view illustrating a recording and reproduction method with respect to a conventional dual-layer optical information recording medium. Viewed from the side on which a laser beam 25 is incident, a first recording layer and a second recording layer are formed. A multilayer structure including the first recording layer is a first recording medium 17 and that including the second recording layer is a second recording medium 18. A first substrate 21 with the first recording medium 17 formed thereon and a second substrate 22 with the second recording medium 18 formed thereon are bonded with an adhesion layer 15, thus obtaining a dual-layer optical information recording medium. With respect to both the first recording medium 17 and the second recording medium 18, recording and reproduction are performed using a laser beam 25 with a wavelength $\lambda$. In the figure, $R_1$ indicates a reflectance of the first recording medium 17 with respect to the wavelength $\lambda$ and $R_2$ denotes a reflectance of the second recording medium 18 with respect to the wavelength $\lambda$.

FIG. 12 is a structural view of a system according to the conventional recording and reproduction method with respect to an optical information recording medium. In order to carry out excellent recording and reproduction with respect to both the first and second recording media, the light absorption ratios of both the recording layers and the light transmittance of the first recording medium with respect to the wavelength $\lambda$ must satisfy predetermined conditions. The light absorption ratio denotes Ac/Aa, where Ac (%) indicates the light absorptance of the recording layers in a crystal state and Aa (%) indicates the light absorptance of the recording layers in an amorphous state. For example, JP 2094839 B discloses that in order to secure an excellent erase rate, it is important to adjust the rising rates of temperature in the crystal state and in the amorphous state to be the same and therefore, it is necessary to satisfy the relationship of Ac/Aa$\geq$1.0.

When the light transmittance of the first recording medium with the first recording layer being in the crystal state is indicated as Tc (%) and the light transmittance of the first recording medium with the first recording layer in the amorphous state as Ta (%), higher light transmittances Tc and Ta are desirable since the second recording medium is recorded or reproduced with a laser beam that has passed through the first recording medium. On the other hand, when the light transmittances Tc and Ta are too high, in view of the distribution of an incident beam, the light absorptances Aa and Ac decrease, thus causing difficulty in recording in the first recording medium.

From the recording experiment using a laser wavelength in the vicinity of 660 nm conducted by the present inventors, it was found that in order to obtain excellent recording and reproduction characteristics in both the first and second recording media, it is preferable that conditions of Tc$\geq$45 and Ta$\geq$45 are satisfied.

In this connection, optical characteristics such as optical reflectance R and light transmittance T in a recording medium with a multilayer structure to be recorded and reproduced and light absorptance A of the respective layers with respect to a wavelength $\lambda$ can be calculated precisely by, for example, a matrix method (for example, see Chapter 3 in "Wave Optics" by Hiroshi Kubota, published by Iwanami Shinsho, 1971) when complex refractive indexes (a refractive index and an extinction coefficient) of the respective layers with respect to the wavelength are known. Therefore, the wavelength dependence of the complex refractive indexes of the respective layers is a key factor for determining the optical characteristics of a multilayer structure.

According to the experiments conducted by the present inventors, in dual-layer recording using a laser wavelength in the vicinity of 660 nm, both the relationships of light absorption ratio$\geq$1.0 and light transmittance$\geq$45% are satisfied, thus obtaining excellent recording and reproduction characteristics in both the first and second recording media.

In the dual-wavelength recording proposed by Wierenga, however, laser beams with wavelengths of 410 nm (blue) and 650 nm (red) are used, and therefore, at least two optical heads are required. In addition, one of the wavelengths is 650 nm, which is long and thus there still is room left for the increase in recording density.

According to optical calculation conducted by the present inventors, due to the high wavelength dependence of the complex refractive indexes of the recording layers, the light absorptance ratio of the first recording layer in the vicinity of a wavelength of 400 nm was no more than 1.0, and thus, the difficulty in satisfying the condition of the light transmittance$\geq$45% in the first recording medium simultaneously was found. In this case, the first recording medium has an insufficient erase rate, or sufficient laser beams do not reach the second recording medium, thus causing a lack of recording power with respect to the second recording medium.

In recording and reproduction of information with respect to such an optical information recording medium, a multiwavelength light source capable of emitting laser beams with a plurality of different wavelengths is used. For instance, such laser beams with a plurality of different wavelengths can be obtained by optical wavelength conversion.

Optical wavelength conversion utilizing a nonlinear optical effect has been applied to various fields to achieve a reduction in wavelength and an increase in operating wavelength range. Particularly, second harmonic generation (SHG) and sum frequency generation (SFG) utilizing a secondary-nonlinear optical effect are effective means for obtaining a short-wavelength light source, and various light sources have been practically used. Among others, in an optical-waveguide nonlinear optical device utilizing an optical waveguide, its efficiency can be improved easily, and it is possible to reduce its size and to provide mass-productivity by a wafer process. Thus, it is expected that the device will be applied to consumer products as a small short-wavelength light source.

Currently, an optical waveguide SHG element generally used is a quasi-phase-matching (QPM) SHG element using a polarization inversion structure having a periodicity. The QPM-SHG element has advantages such that a phase matching wavelength can be set arbitrarily by means of a polarization inversion period, wavelengths can be converted with high efficiency, and the like, which enable optical waveguides for different phase matching wavelengths to be formed in one element. Conventionally, QPM-SHG elements using this have been proposed.

FIG. 13 shows a plan view illustrating an example of a conventional optical waveguide device in which optical waveguides having different phase matching characteristics are integrated on one substrate. In FIG. 13, a plurality of optical waveguides 132 are formed on a LiNbO$_3$ substrate 131 and a polarization inversion structure 133 with different periods is formed so as to traverse the optical waveguides 132, thus forming a plurality of optical waveguides having different phase matching characteristics on one substrate. As a disadvantage of the QPM-SHG element, there is a problem that the tolerance with respect to phase matching wavelengths is extremely narrow. In this element, optical waveguides allowing phase matching wavelengths to be gradually different are formed, which permits optical waveguides for phase matching with the wavelength of a fundamental light source to be formed in any location. In other words, the selection of a suitable optical waveguide enables the phase matching with the fundamental wave with an arbitrary wavelength.

FIG. 14 is a plan view illustrating a conventional QPM-SHG element, in which the tolerance with respect to the phase matching wavelength is increased, as an optical waveguide device with optical waveguides for different phase matching wavelengths integrated on a substrate. In FIG. 14, one optical waveguide 142 is formed on a substrate 141 and a plurality of polarization inversion regions Λ1, Λ2, and Λ3 are formed on the optical waveguide 142 as a polarization inversion structure 143. The respective polarization inversion regions have different phase matching conditions. With the combination of the polarization inversion regions with the different phase matching conditions, it is intended to increase the tolerance with respect to the phase matching wavelength in the optical waveguide device as a whole. By the increase in the tolerance with respect to the wavelength, stable output characteristics to the variations in wavelengths of fundamental waves can be obtained.

On the other hand, it also has been proposed to obtain a light source with a plurality of wavelengths using a semiconductor laser. There is a method including forming different active layers on a semiconductor laser and emitting laser beams with different wavelengths from one chip.

The present invention is intended to achieve a configuration for obtaining a plurality of coherent beams with different wavelengths from a single emission point or adjacent emission points using an optical waveguide device.

On the other hand, in a conventional waveguide optical device, a plurality of optical waveguides with different phase matching characteristics are integrated on one device, but the configuration for simultaneous conversion of different wavelengths of fundamental waves has not been proposed.

Furthermore, there has been a configuration for emitting beams with different wavelengths simultaneously from a semiconductor laser of one chip. However, since emission parts of optical waveguides are formed at different positions, when two emission beams are intended to be focused simultaneously with one optical system, great aberration is caused and a complicated optical system is provided for obtaining focusing characteristics within the diffraction limit, which have been problems.

SUMMARY OF THE INVENTION

Therefore, the present invention is intended to solve the above-mentioned problems. A first object of the present invention is to provide an optical information recording medium in which even with respect to short wavelengths in the vicinity of 400 nm, both conditions of light absorptance ratio≧1.0 in a first recording layer and light transmittance≧45% in a first recording medium are satisfied, and both an erase rate of the first recording medium and recording sensitivity of a second recording medium are increased, and a method of recording and reproducing with respect to the optical information recording medium.

A second object of the present invention is to provide an optical waveguide device capable of emitting multiwavelength coherent beams with different wavelengths simultaneously, a multiwavelength light source in which the optical waveguide device and a light source are combined to form one body, and an optical system for recording and reproducing information with respect to the above-mentioned optical information recording medium using the multiwavelength light source.

In order to achieve the first object, an optical information recording medium according to the present invention includes at least two recording layers formed of a phase change material on a substrate and is recorded and reproduced by laser beams from one side. The recording layers include a first recording layer and a second recording layer from the laser beam incident side, the first recording layer is included in a first recording medium and the second recording layer is included in a second recording medium. When a wavelength of a first laser beam with which recording and reproduction are performed with respect to the first recording medium is indicated as λ1 (nm), a wavelength of a second laser beam with which the second recording medium is recorded and reproduced as λ2 (nm), a light absorptance of the first recording layer in a crystal state as Ac (%), a light absorptance of the first recording layer in an amorphous state as Aa (%), a light transmittance of the first recording medium with the first recording layer being in the crystal state as Tc (%), a light transmittance of the first recording medium with the first recording layer being in the amorphous state as Ta (%), and the relationship between the wavelengths λ1 and λ2 is expressed by 10≦|λ1−λ2|120, the first recording layer has a light absorption ratio Ac/Aa in a predetermined range with respect to the wavelength λ1 and the first recording medium satisfies conditions of Tc≧30 and Ta≧30 with respect to the wavelength λ2.

According to this optical information recording medium, a sufficiently high light absorptance ratio of the first recording layer and light transmittance of the first recording medium can be obtained. Therefore, by using the combination of the wavelengths λ1 and λ2, for example, the light absorptance ratio can be varied from about 1.0 to about 1.6 and the light transmittance from over 30% to over 60%. Thus, the optical information recording medium has the following effects. That is, the light absorptance ratio of the first recording layer and the light transmittance of the first recording medium are adjusted according to the materials and recording conditions of the first and second recording layers, thus obtaining excellent recording and reproduction characteristics in both the first and second recording media.

In the optical information recording medium of the present invention, it is preferable that when the relationship between the wavelengths λ1 and λ2 is expressed by 10≦|λ1−λ2|50, the first recording layer has a light absorption ratio Ac/Aa in a predetermined range with respect to the wavelength λ1 and the first recording medium satisfies conditions of Tc≧45 and Ta≧45 with respect to the wavelength λ2.

According to this configuration, the following effects can be obtained. The first recording medium and the second recording medium are recorded and reproduced with different wavelengths close to each other. Therefore, both the recording media are recorded with substantially the same recording density. In addition, with respect to the short wavelengths in the vicinity of 400 nm, both the conditions of the light absorptance ratio≧1.0 in the first recording layer and the light transmittance≧45% in the first recording medium are satisfied, and excellent recording and reproduction characteristics can be obtained in both the first and second recording media.

In the optical information recording medium of the present invention, it is preferable that the second recording medium, the first recording medium and a protective layer are formed on the substrate sequentially, a thickness d1 (μm) of the protective layer is in a range of 30≦d1≦200, and recording and reproduction are performed with the first and second laser beams from the protective layer side.

According to this configuration, recording and reproduction are performed from the side of the protective layer, which is thinner than the substrate, and therefore the numeral aperture of a lens can be increased, thus enabling recording with a higher recording density.

In the optical information recording medium of the present invention, it is preferable that the first recording medium formed on a first substrate and the second recording medium formed on a second substrate are bonded to each other.

In the optical information recording medium of the present invention, it also is preferable that recording and reproduction are performed with a first laser beam and a second laser beam emitted from a multiwavelength light source in which a part of an optical waveguide of a second harmonic generation element and an optical waveguide of a semiconductor laser are optically coupled.

In the optical information recording medium of the present invention, it is preferable that the wavelength λ1 (nm) of the first laser beam is in a range of 390≦λ1≦520.

In the optical information recording medium of the present invention, it is preferable that a condition of the light absorption ratio Ac/Aa ≧1.0 in the first recording layer is satisfied with respect to the wavelength λ1 of the first laser beam.

In the optical information recording medium of the present invention, it is preferable that the first recording layer contains Ge—Sb—Te.

Further, in the optical information recording medium of the present invention, it is preferable that the first recording layer contains Ge—Sb—Te—Sn. This provides an effect that by using a recording material with a higher crystallization rate than that of Ge—Sb—Te for the first recording layer, a higher erase rate can be obtained.

In the optical information recording medium of the present invention, it is preferable that a thickness d2 (nm) of the first recording layer is in a range of 3≦d2≦12.

The upper limit of the thickness d2 of the first recording layer is required for securing a light transmittance of at least 45% in the first recording medium. The lower limit of the thickness d2 corresponds to a critical thickness for preventing islands from being formed, crystallization from being stopped due to lack of atoms, and a film capacity for absorbing beams from being reduced. In view of its optical design, a more preferable thickness is about 6 nm.

Furthermore, in the optical information recording medium of the present invention, it is preferable that the first recording medium includes at least the first recording layer and a reflective layer formed sequentially on the substrate, and a thickness d3 (nm) of the reflective layer is in a range of 2≦d3≦20.

The upper limit of the thickness d3 of this reflective layer is required for securing a light transmittance of at least 45% in the first recording medium. The lower limit of the thickness d3 corresponds to a critical thickness for preventing islands from being formed, a rapidly cooling effect from being reduced, and environment-resistance characteristics from being deteriorated.

In order to achieve the first object, a method of recording and reproducing with respect to an optical information recording medium according to the present invention is one in which, with respect to an optical information recording medium including at least two recording layers formed of a phase change material on a substrate, recording and reproduction are performed from one side using laser beams. The recording layers include a first recording layer and a second recording layer from the laser beam incident side. The first recording layer is included in a first recording medium and the second recording layer is included in a second recording medium. When a wavelength of a first laser beam with which recording and reproduction are performed with respect to the first recording medium is indicated as λ1 (nm), and a wavelength of a second laser beam with which the second recording medium is recorded and reproduced as λ2 (nm), the relationship between the wavelengths λ1 and λ2 is expressed by 10≦|λ1−λ2|120.

According to this method of recording and reproducing with respect to an optical information recording medium, a sufficiently high light absorptance ratio of the first recording layer and light transmittance of the first recording medium can be obtained. Therefore, by the combination of the wavelengths λ1 and λ2, for example, the light absorptance ratio can be varied from about 1.0 to about 1.6 and the light transmittance from over 30% to over 60%. Thus, this method has the following effects. That is, the light absorptance ratio of the first recording layer and the light transmittance of the first recording medium are adjusted according to the materials and recording conditions of the first and second recording layers, thus obtaining excellent recording and reproduction characteristics in both the first and the second recording media.

In the method of recording and reproducing with respect to an optical information recording medium according to the present invention, it is preferable that the relationship between the wavelengths λ1 and λ2 is expressed by $10 \leq |\lambda 1 - \lambda 2| \leq 50$.

According to this configuration, the following effects can be obtained. The first recording medium and the second recording medium are recorded and reproduced with different wavelengths close to each other. Therefore, both the recording media can be recorded with substantially the same recording density, and excellent recording and reproduction characteristics can be obtained.

In the method of recording and reproducing with respect to an optical information recording medium according to the present invention, it is preferable that with respect to an optical information recording medium in which the second recording medium, the first recording medium, and a protective layer are formed on the substrate sequentially and a thickness d1 (μm) of the protective layer is in a range of $30 \leq d1 \leq 200$, and recording and reproduction are performed with the first and second laser beams from the protective layer side.

According to this configuration, recording and reproduction are performed from the side of the protective layer, which is thinner than the substrate, and therefore the numeral aperture of a lens can be increased, thus enabling recording with a higher recording density.

In the method of recording and reproducing with respect to an optical information recording medium according to the present invention, it is preferable that recording and reproduction are performed with respect to an optical information recording medium in which the first recording medium formed on a first substrate and the second recording medium formed on a second substrate are bonded to each other.

In the method of recording and reproducing with respect to an optical information recording medium according to the present invention, it is preferable that recording and reproduction are performed with a first laser beam and a second laser beam emitted from a multiwavelength light source in which a part of an optical waveguide of a second harmonic generation element and an optical waveguide of a semiconductor laser are optically coupled.

Furthermore, in the method of recording and reproducing with respect to an optical information recording medium according to the present invention, it is preferable that the wavelength λ1 (nm) of the first laser beam is in a range of $390 \leq \lambda 1 \leq 520$.

In order to achieve the second object, an optical waveguide device of the present invention includes a substrate, a plurality of optical waveguides formed in the vicinity of a surface of the substrate, injection parts formed at one end of the optical waveguides, and emission parts formed on the other end of the optical waveguides. The optical waveguide device is characterized in that the plurality of optical waveguides satisfy phase matching conditions different from one another, and the emission parts of the plurality of optical waveguides are provided at substantially the same position.

According to the optical waveguide device of the present invention, different wavelengths of fundamental waves from a light source can be converted simultaneously and beams with different wavelengths are emitted from a single emission part, thus obtaining beams of the light sources emitted from a single point. Therefore, by using a collective lens system with a symmetrical structure in which correction for chromatic aberration has been made, the beams can be focused within the diffraction limit.

In the optical waveguide device of the present invention, it is preferable that the optical waveguides have periodical polarization inversion structures. In this case, the optical waveguides are provided with the polarization inversion structures with different periods, respectively.

According to this configuration, using photolithography and dry etching, optical waveguides with various phase matching conditions can be formed easily on the substrate.

In the optical waveguide device of the present invention, it is preferable that the optical waveguide device includes reflectors at parts of the optical waveguides.

According to this configuration, the use of the reflectors allows long optical waveguides to be formed on a substrate in a small area. Thus, the substrate area can be utilized effectively and the efficiency of the wavelength conversion can be increased.

In the optical waveguide device of the present invention, it is preferable that a line normal to a surface opposing the substrate in the emission parts of the optical waveguides and the surface of the substrate form an angle of about 45 degrees.

According to this configuration, emitted beams can be extracted from an upper or back surface of the substrate. Therefore, a grating, a detector, or the like can be integrated on the substrate easily, thus obtaining a small integrated light source.

Furthermore, in the optical waveguide device of the present invention, it is preferable that the phase matching conditions are those with respect to second harmonics.

According to this configuration, by the coupling of a currently commercially available semiconductor laser with different wavelengths to the optical waveguide device, beams with a plurality of wavelengths in a 400-nm band of a blue luminescence range can be emitted from a single optical waveguide device easily, thus achieving high density optical recording with respect to an optical information recording medium.

Alternatively, in the optical waveguide device of the present invention, it is preferable that the phase matching conditions are those with respect to a sum frequency.

According to this configuration, through the addition of a polarization inversion region satisfying a phase matching condition with respect to a sum frequency, the number of emission wavelengths can be increased further.

In the optical waveguide device of the present invention, it is preferable that the optical waveguides are optically coupled partially to one another.

According to this configuration, long optical waveguides can be formed in a small substrate area. Thus, the substrate area can be utilized effectively and the efficiency of the wavelength conversion can be increased.

In order to achieve the second object, a multiwavelength light source of the present invention includes a plurality of coherent light sources with different wavelengths and an optical waveguide device. The optical waveguide device includes a substrate, a plurality of optical waveguides formed in the vicinity of a surface of the substrate, injection parts formed at one end of the optical waveguides, and emission parts formed on the other end of the optical waveguides. The plurality of optical waveguides satisfy phase matching conditions different from one another, and the emission parts of the plurality of optical waveguides are provided at substantially the same position. The multiwavelength light source is characterized in that the wavelengths of beams emitted from the coherent light sources are converted by the optical waveguide device.

According to this multiwavelength light source, different wavelengths of fundamental waves from the coherent light sources can be converted simultaneously and beams with different wavelengths are emitted from a single emission part, thus obtaining beams of the light sources emitted from a single point. Therefore, by using a collective lens system with a symmetrical structure in which correction for chromatic aberration has been made, the beams can be focused within the diffraction limit.

In the multiwavelength light source of the present invention, it is preferable that the coherent light sources are semiconductor lasers and the injection parts of the optical waveguide device and the semiconductor lasers are coupled directly.

In the multiwavelength light source of the present invention, it also is preferable that the coherent light sources with different wavelengths are multi-stripe semiconductor lasers formed on one substrate.

Furthermore, in the multiwavelength light source of the present invention, it is preferable that the coherent light sources have a function for varying wavelengths.

According to this configuration, with respect to a second harmonic generation (SHG) element of a quasi-phase-matching (QPM) type with a small tolerance of about 0.1 nm with respect to a phase matching wavelength, the wavelengths of the coherent light sources are varied and controlled to be matched with the phase matching wavelengths, thus achieving the wavelength conversion with high efficiency. In addition, even when the phase matching wavelength is varied due to the variation in ambient temperature, the wavelengths of the coherent light sources are varied and controlled, thus obtaining stable outputs continually. Moreover, the control of the phase matching wavelength also enables switching of the beams to be emitted.

In the multiwavelength light source of the present invention, it is preferable that the optical waveguide device includes an electrode structure including electrodes and outputs are modulated by means of the electrodes.

According to this configuration, when the electrode structure is integrated on the optical waveguides and voltage is applied to the electrode structure to change the refractive indexes of the optical waveguides to perform output modulation, variations in emission wavelengths of the semiconductor lasers accompanying output variation are eliminated as compared to the case of the modulation of outputs from the semiconductor lasers, thus achieving stable output modulation.

In order to achieve the second object, an optical system of the present invention includes a multiwavelength light source and a focusing optical system. The multiwavelength light source includes a plurality of coherent light sources with different wavelengths and an optical waveguide device. The optical waveguide device includes a substrate, a plurality of optical waveguides formed in the vicinity of a surface of the substrate, injection parts formed at one end of the optical waveguides, and emission parts formed on the other end of the optical waveguides. The plurality of optical waveguides satisfy phase matching conditions different from one another, and the emission parts of the plurality of optical waveguides are provided at substantially the same position. In the multiwavelength light source, the wavelengths of beams from the coherent light sources are converted by the optical waveguide device.

According to this optical system, without using a special collective lens, a grating element for aberration correction inside the optical system, or the like, optical adjustment is facilitated with the simplified optical system. In addition, this optical system is highly effective when a multiwavelength light source for short wavelengths is used.

It is preferable that the optical system of the present invention further includes a wavelength filter, and the wavelength filter separates beams from the multiwavelength light source and detected lights.

According to this configuration, for instance, the wavelength filter is formed between two recording layers included in an optical information recording medium and allows beams with two wavelengths to reach the first recording layer but allows only one of the beams with two wavelengths to reach the second recording layer, thus separating the two wavelengths. Consequently, the influence on the second recording layer when the first recording layer is recorded or reproduced can be reduced. Furthermore, when the wavelength filter is provided before a photodetector, it separates two wavelengths and after the separation, beams with respective different wavelengths are detected by different photodetectors, thus enabling simultaneous reproduction with respect to the first and second recording layers. In addition, one of the beams can be used exclusively for reproduction and the other can be used exclusively for recording and erasure, thus achieving high speed optical recording requiring no switching of optical outputs of a light source. Since the emission points are at the same position in the multiwavelength light source, beams with two wavelengths can be focused on a single focal point, thus allowing recording and reproduction to be performed simultaneously.

In the optical system of the present invention, it is preferable that beams emitted from the multiwavelength light source are subjected to intensity modulations that are different according to their wavelengths.

According to this configuration, a beam with one of the wavelengths is allowed to have continuous wave (CW) motion and a beam with the other wavelength is modulated at a high frequency, thus allowing outputs of the SHG element to be increased considerably.

In addition, it is preferable that the optical system of the present invention further includes an optical information recording medium according to the present invention, and the beams from the multiwavelength light source are focused on the optical information recording medium by the focusing optical system.

In the optical system of the present invention, it is preferable that with respect to the optical information recording medium, recording or reproduction is performed simultaneously with beams with a plurality of wavelengths from the multiwavelength light source.

In the optical system of the present invention, it also is preferable that the optical information recording medium is recorded with at least one beam with a wavelength from the multiwavelength light source and simultaneously information is detected from the optical information recording medium with a beam with another wavelength from the multiwavelength light source.

In this case, it is preferable that, based on signals detected by the beam with another wavelength from the multiwavelength light source, the intensity of the at least one beam with a wavelength and a focal point on the optical information recording medium are controlled.

According to this configuration, recording is performed while record information is detected in real time in recording and this information is fed back to control the intensity of recording beams and the focal point on the recording medium. Consequently, shapes of recording pits to be formed in the recording medium can be controlled precisely, thus increasing recording density considerably.

Furthermore, in the optical system of the present invention, it is preferable that beams with a plurality of wavelengths from the multiwavelength light source are mixed, with which the optical information recording medium is recorded.

DETAILED DESCRIPTION OF THE INVENTION

Preferable embodiments of the present invention are described with reference to the drawings as follows.

First, the following description is directed to optical information recording media according to the present invention.

FIRST EMBODIMENT

Figure 1:
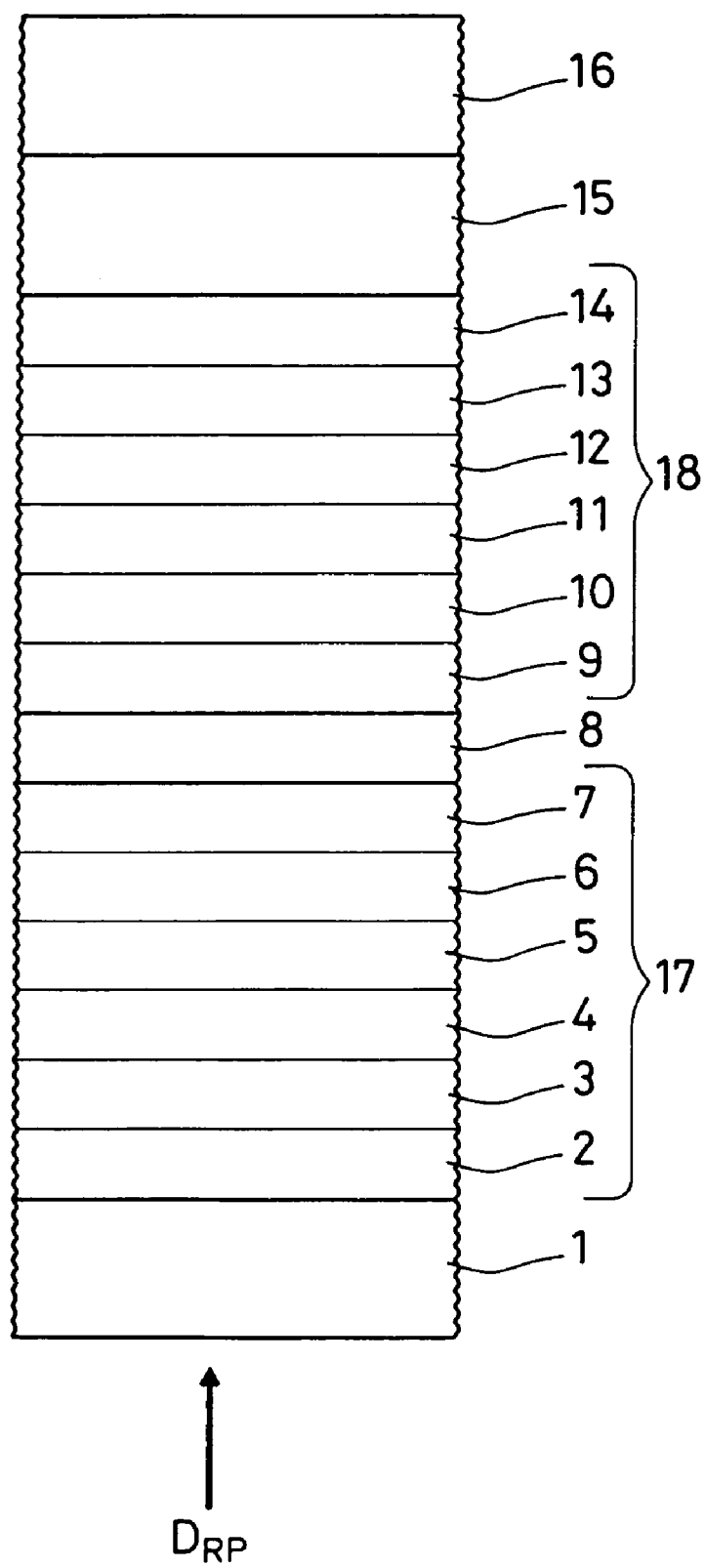
FIG. 1 is a partial sectional view showing a structural example of an optical information recording medium according to a first embodiment of the present invention.

FIG. 1 shows a structural example of an optical information recording medium according to a first embodiment of the present invention. This optical information recording medium has the following configuration. On a substrate 1, a first lower optical interference layer 2, a first lower interface layer 3, a first recording layer 4, a first upper interface layer 5, a first upper optical interference layer 6, and a first reflective layer 7 are stacked sequentially. Subsequently, a separation layer 8 is provided on the first reflective layer 7. On the separation layer 8, a second lower optical interference layer 9, a second lower interface layer 10, a second recording layer 11, a second upper interface layer 12, a second upper optical interference layer 13, and a second reflective layer 14 are stacked sequentially. This stacked body is bonded to a dummy substrate 16 with an adhesion layer 15, thus forming the optical information recording medium. The multilayer structure from the first lower optical interference layer 2 to the first reflective layer 7 is a first recording medium 17. Similarly, the multilayer structure from the second lower optical interference layer 9 to the second reflective layer 14 is a second recording medium 18. In this structural example, the recording and reproduction side $D_{RP}$ is the substrate 1 side.

As the substrate 1, one with a disk shape and guide grooves for guiding laser beams formed as required, which is formed of glass or resin such as polycarbonate, amorphous polyolefin, or PMMA, can be used, and a transparent substrate with a smooth surface is used.

The first lower optical interference layer 2 is a dielectric thin film and has a function of adjusting an optical distance to improve light absorption efficiency in the recording layers and increasing the variation in quantity of reflected light before and after recording to increase signal amplitude. Examples of materials that can be used for the optical interference layers include oxides such as $SiO_2$, $Ta_2O_5$, or the like, nitrides such as SiN, AlN, TiN, TaN, ZrN, GeN, or the like, sulfides such as ZnS or the like, carbides such as SiC or the like, and mixtures thereof. Among such materials, a mixture of $ZnS$—$SiO_2$ is an amorphous material and has a high refractive index, a high film formation rate, an excellent mechanical characteristic, and excellent moisture resistance. When this is used, a particularly excellent optical interference layer is obtained. The thickness of the optical interference layers can be determined precisely according to the calculation based on, for instance, a matrix method (for example, see Chapter 3, "Wave Optics" by Hiroshi KUBOTA, published by Iwanami Shinsho, 1971) so as to satisfy the conditions for obtaining a greater variation in quantity of reflected light between the crystalline (before recording) and amorphous (after recording) states of the recording layers and a higher light absorptance in the recording layers.

The first lower interface layer 3 has a function of preventing mass transfer caused between the first lower optical interference layer 2 and the first recording layer 4 due to repeated recording. For the first lower interface layer 3, nitrides including Si, Al, Zr, Ti, Ge, Ta, or the like, nitride oxides including them, or carbides including Si or the like are used. When using such materials, the first lower interface layer 3 can be formed by reactive sputtering of a metal base material in an Ar gas atmosphere and a reactive gas atmosphere or by sputtering of a compound base material in an Ar gas atmosphere or in an Ar gas atmosphere and a reactive gas atmosphere. When the first lower interface layer 3 is thick, the reflectance and light absorptance of the multilayer structures are changed considerably, which affects the performance of recording and erasure. Therefore, it is preferable that the first lower interface layer 3 has a thickness of 1 nm to 7 nm, more preferably about 5 nm.

Materials used for the first recording layer 4, as materials in which reversible phase transformation between a crystal phase and an amorphous phase occurs by irradiation of a high energy beam, include those containing, as a base material, Ge—Sb—Te, Ge—Sn—Sb—Te, Ge—Bi—Te, Ge—Sn—Te, In—Sb—Te, Sb—Te, Ge—Te, or Ag—In—Sb—Te, or those obtained by adding at least one of Au, Ag, Cu, Al, Ga, Pd, Pt, Ni, Ce, Cr, Bi, Sn, Se, In, La, C, Si, Ti, Mo, W, Ta, Hf, Zr, Nb, and V thereto. In addition, N or O also can be added. Among others, Ge—Sb—Te enables excellent recording and erasure performance to be secured by a GeTe—$Sb_2Te_3$ pseudobinary composition as a rapid crystallization material. The composition in a range of GeTe:$Sb_2Te_3$=x: 1 ($1 \leq x \leq 10$) provides excellent phase stability, which is a practically preferable composition. The material Ge—Sn—Sb—Te is one obtained by adding SnTe to the GeTe—$Sb_2Te_3$ pseudobinary composition and is expressed by the composition formula of x[(Ge—Sn)Te]—$Sb_2Te_3$. It has been verified by an experiment conducted by the inventors that an excellent material with a further improved crystallization rate can be obtained by substituting Sn for a part of Ge. The first recording layer 4 can be formed using such a material as its basic material by a sputtering method in an atmosphere of an Ar gas or a mixed gas of an Ar gas and a $N_2$ gas. In this case, the first recording medium 17 requires a light transmittance of at least 45%. Therefore, the thickness of the first recording layer 4 is 12 nm at most. When it is too thin, islands are formed, crystallization is stopped due to lack of atoms, a film capacity for light absorption is reduced, and the like. For such reasons, the first recording layer 4 is required to have a thickness of at least about 3 nm. In view of its optical design, a more preferable thickness is about 6 nm.

The first upper interface layer 5 has functions of preventing mass transfer caused between the first recording layer 4 and the first upper optical interference layer 6 due to repeated recording and of improving reliability in an overwrite performance of the first recording medium 17. For the first upper interface layer 5, materials containing the same base materials as those used for the first lower interface layer 3 can be used. In addition, a preferable thickness of the first upper interface layer 5 also is the same as that of the first lower interface layer 3 and is about 5 nm.

The upper optical interference layer 6 has the same functions as those of the first lower optical interference layer 2 and also has a function of adjusting the cooling rate of the first recording layer 4 by adjusting the distance from the first recording layer 4 to the first reflective layer 7. For the first upper optical interference layer 6, materials containing the same base materials as those used for the first lower optical interference layer 2 can be used and its thickness is determined precisely.

For the first reflective layer 7, Al, Au, Ag or Cu, or an alloy thereof to which further an additive is added is used. The first reflective layer 7 has an optical function of increasing the quantity of light absorbed in the first recording layer 4 and a thermal function of diffusing heat generated in the first recording layer 4 rapidly. Furthermore, the first reflective layer 7 also serves for protecting the multilayer film from an operating environment. These materials of the reflective layer are excellent in corrosion resistance and satisfy the rapidly cooling condition. The thickness of the first reflective layer 7 also is 20 nm at most so that a light transmittance of at least 45% can be obtained in the first recording medium 17. When it is too thin, islands are formed, the rapidly cooling effect is reduced, environment-resistance characteristics are deteriorated, and the like. For such reasons, the first reflective layer 7 is required to have a thickness of at least about 2 nm.

The separation layer 8 is provided for distinguishing focal positions in the first recording medium 17 and the second recording medium 18. The separation layer 8 has guide grooves formed on the side of the second recording medium 18. As the material of the separation layer 8, a photocurable resin or a delayed-action resin can be used. The separation layer 8 is required to have a thickness equal to or greater than a focal depth $\Delta Z$ determined by a numerical aperture NA of an objective lens and a laser beam wavelength $\lambda$. If 80% of the intensity in no aberration is taken as a reference of that at a focal point, the focal depth $\Delta Z$ can be approximated with a formula, $\Delta Z=\lambda/\{2(NA)^2\}$. When $\lambda$=400 nm and NA=0.6, the focal depth $\Delta Z$=0.556 µm, and as a result, the values within ±0.6 µm are within the focal depth. Consequently, the separation layer 8 is required to have a thickness of at least 1 µm. It is preferable that the upper limit of the thickness is set to be within a tolerance of the substrate thickness that is acceptable for the objective lens when being added to the thickness of the substrate 1 so that the distance between the first recording medium 17 and the second recording medium 18 is within a range in which the objective lens can focus beams. Therefore, a preferable thickness is in the range between 1 µm and 50 µm. The separation layer 8 can be formed as follows. After a first recording medium 17 is formed on the substrate 1, photocurable resin is applied thereto and guide grooves are transferred to the photocurable resin from the stamper. Then, the photocurable resin is cured by ultraviolet irradiation from the substrate 1 side. The stamper is removed from the cured resin, thus forming the guide grooves in the separation layer 8. Subsequently, the respective layers of the second recording medium 18 are laminated on the separation layer 8 sequentially.

The second lower optical interference layer 9 has the same functions as those of the first lower optical interference layer 2. For the second lower optical interference layer 9, the materials containing the same base materials as those used for the first lower optical interference layer 2 can be used and its thickness is determined precisely.

The second lower interface layer 11, has the same function as that of the first lower interface layer 3. Materials containing the same base materials as those used for the first lower interface layer 3 can be used for the second lower interface layer 10 and its preferable thickness is about 5 nm, which also is the same as that of the first lower interface layer 3.

For the second recording layer 11, materials containing the same base materials as those used for the first recording layer 4 can be used. In this case, with respect to the light transmittance of the second recording medium 18, there are no limited conditions such as those in the first recording medium 17. Therefore, it is preferable that the second recording layer 11 has a thickness in the range between 7 nm and 15 nm, further preferably about 10 nm so as to have a capacity allowing sufficient light to be absorbed and so as not to allow heat to be stored for a long period of time.

The second upper interface layer 12 has the same functions as those of the first upper interface layer 5. Materials containing the same base materials as those used for the first upper interface layer 5 can be used for the second upper interface layer 12 and its preferable thickness is about 5 nm, which also is the same as that of the first upper interface layer 5.

The second upper optical interference layer 13 has the same functions as those of the first upper optical interference layer 6. For the second upper optical interference layer 13, materials containing the same base materials as those used for the first upper optical interference layer 6 can be used and its thickness is determined precisely.

The second reflective layer 14 has the same functions as those of the first reflective layer 7, for which materials containing the same base materials as those used for the first reflective layer 7 can be used. Preferably, the second reflective layer 14 has a thickness in the range between 50 nm and 100 nm so as to be saturated optically and to satisfy the rapidly cooling condition sufficiently.

For the adhesion layer 15, a photocurable resin, a delayed-action resin, or a hot melt resin can be used. In addition, a material containing acrylic resin as a main component or a material containing epoxy resin as a main component can be used.

For the dummy substrate 16, materials containing the same base materials as those used for the substrate 1 can be used.

SECOND EMBODIMENT

Figure 2:
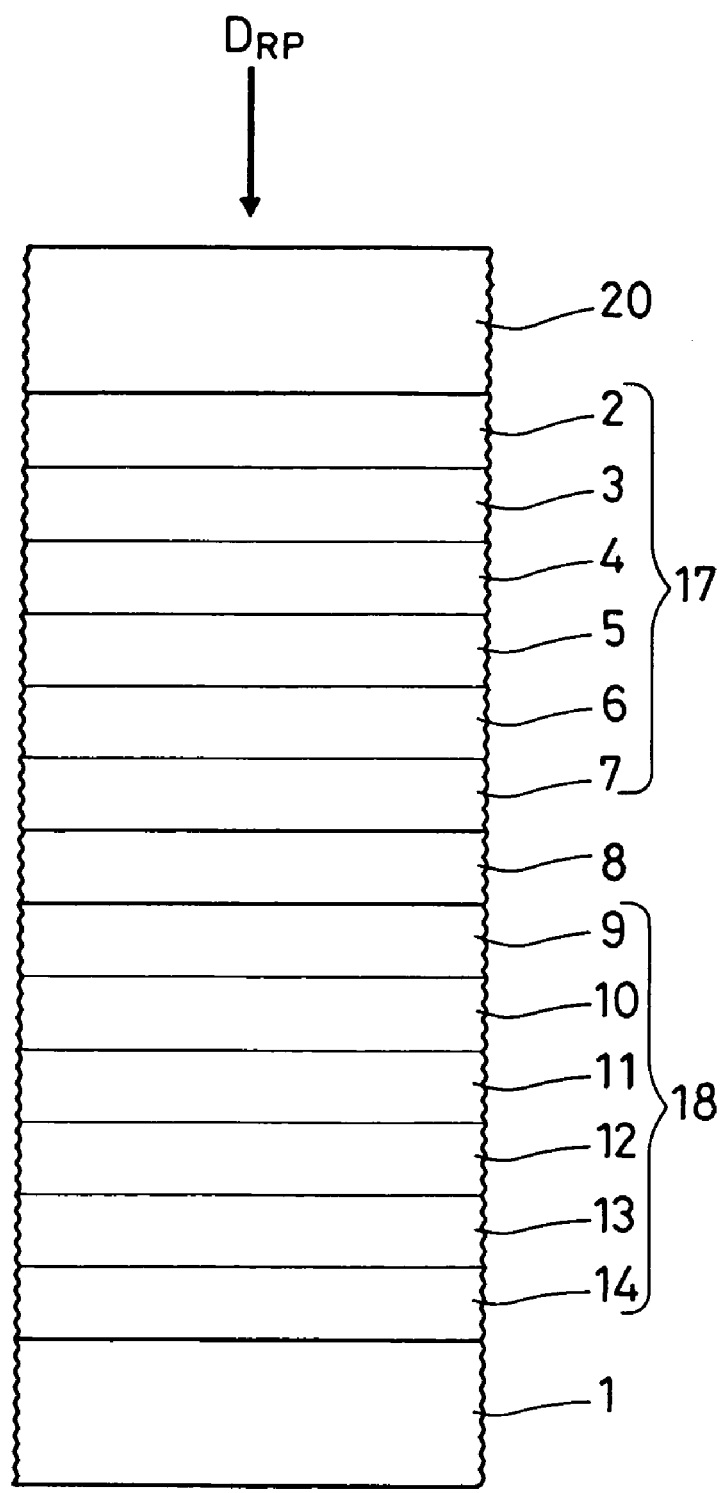
FIG. 2 is a partial sectional view showing a structural example of an optical information recording medium according to a second embodiment of the present invention.

FIG. 2 shows a structural example of an optical information recording medium according to a second embodiment of the present invention. This optical information recording medium has the following configuration. On a substrate 1, a second reflective layer 14, a second upper optical interference layer 13, a second upper interface layer 12, a second recording layer 11, a second lower interface layer 10, and a second lower optical interference layer 9 are stacked sequentially. Subsequently, a separation layer 8 is provided on the second lower optical interference layer 9. On the separation layer 8, a first reflective layer 7, a first upper optical interference layer 6, a first upper interface layer 5, a first recording layer 4, a first lower interface layer 3, and a first lower optical interference layer 2 are stacked sequentially. On the first lower optical interference layer 2, a protective layer 20 is provided. The multilayer structure from the first lower optical interference layer 2 to the first reflective layer 7 is a first recording medium 17. Similarly, the multilayer structure from the second lower optical interference layer 9 to the second reflective layer 14 is a second recording medium 18. In this structural example, the recording and reproduction side $D_{RP}$ is the protective layer 20 side. In this case, recording and reproduction are performed from the side of the protective layer 20, which is thinner than the substrate 1. Therefore, the numerical aperture of a lens can be increased, thus enabling recording with higher density. For example, according to "A Rewritable Optical Disk System With Over 10 GB Of Capacity" (Proc. SPIE. Optical Data Storage'98, 3401, 80–86 (1998)) by Kiyoshi Osato, it is possible to obtain a numerical aperture NA of 0.6 to 0.85.

As the materials of the respective layers included in the first recording medium 17 and the second recording medium 18, materials containing the same base materials as those in the first embodiment can be used.

In the present embodiment, however, since the separation layer 8 is formed on the second recording medium 18, the curing method is different from that in the first embodiment. As the material of the separation layer 8, a transparent delayed-action resin is used. The delayed-action resin is applied to the second lower optical interference layer 9, and initially a weak ultraviolet light is irradiated thereon. Then, guide grooves of a stamper are transferred to the delayed-action resin, which is left in this state. Curing starts sequentially from the surface on which the ultraviolet light has been irradiated and is completed in a predetermined time. After the completion of the curing, the stamper is removed from the resin, thus forming the guide grooves.

The time required for the curing can be adjusted by the intensity of the ultraviolet light to be irradiated and the components of the resin. When a transparent ultraviolet curable resin is used, it also is possible to cure the rein by ultraviolet irradiation from the end face side of the substrate 1. Then, the respective layers of the first recording medium 17 are stacked sequentially.

As the protective layer 20, an ultraviolet curable resin or a transparent thin plate can be used. Preferably, the protective layer 20 has a thickness in the range between 30 µm and 200 µm. The protective layer 20 can be formed by spin coating or the like.

THIRD EMBODIMENT

Figure 3:
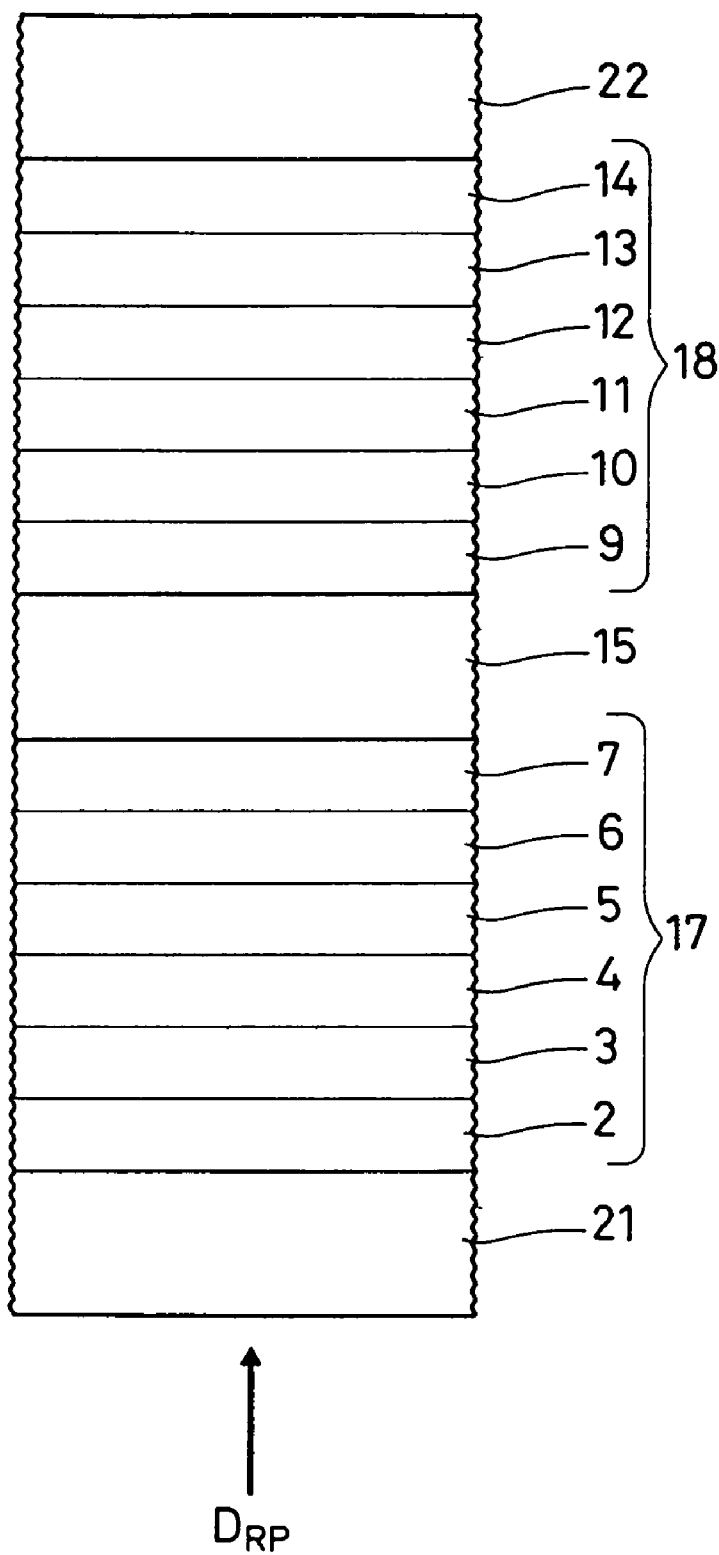
FIG. 3 is a partial sectional view showing a structural example of an optical information recording medium according to a third embodiment of the present invention.

FIG. 3 shows a structural example of an optical information recording medium according to a third embodiment of the present invention. This optical information recording medium has the following configuration. On a substrate 21, a first lower optical interference layer 2, a first lower interface layer 3, a first recording layer 4, a first upper interface layer 5, a first upper optical interference layer 6, and a first reflective layer 7 are stacked sequentially. On a second substrate 22, a second reflective layer 14, a second upper optical interference layer 13, a second upper interface layer 12, a second recording layer 11, a second lower interface layer 10, and a second lower optical interference layer 9 are stacked sequentially. The multilayer structure from the first lower optical interference layer 2 to the first reflective layer 7 is a first recording medium 17. Similarly, the multilayer structure from the second lower optical interference layer 9 to the second reflective layer 14 is a second recording medium 18. The first substrate 21 with the first recording medium 17 formed thereon and the second substrate 22 with the second recording medium 18 formed thereon are bonded with an adhesion layer 15.

For the materials of the respective layers included in the first recording medium 17 and the second recording medium 18, materials containing the same base materials as those in the first or second embodiment can be used.

As the first substrate 21 and the second substrate 22, one having a disk shape and guide grooves for guiding laser beams, which is formed of glass or resin such as polycarbonate, amorphous polyolefin, or PMMA, can be used, and a transparent substrate with a smooth surface is used.

For the adhesion layer 15, a transparent photocurable resin or a transparent delayed-action resin can be used. The desirable thickness of the adhesion layer 15 is the same as that of the separation layer 8 in the first embodiment, i.e. in the range between 1 µm and 50 µm. In this configuration, the adhesion layer 15 also functions as a separation layer.

The following description is directed to a method of recording and reproducing with respect to the optical information recording media according to the present invention.

FOURTH EMBODIMENT

Figure 4:
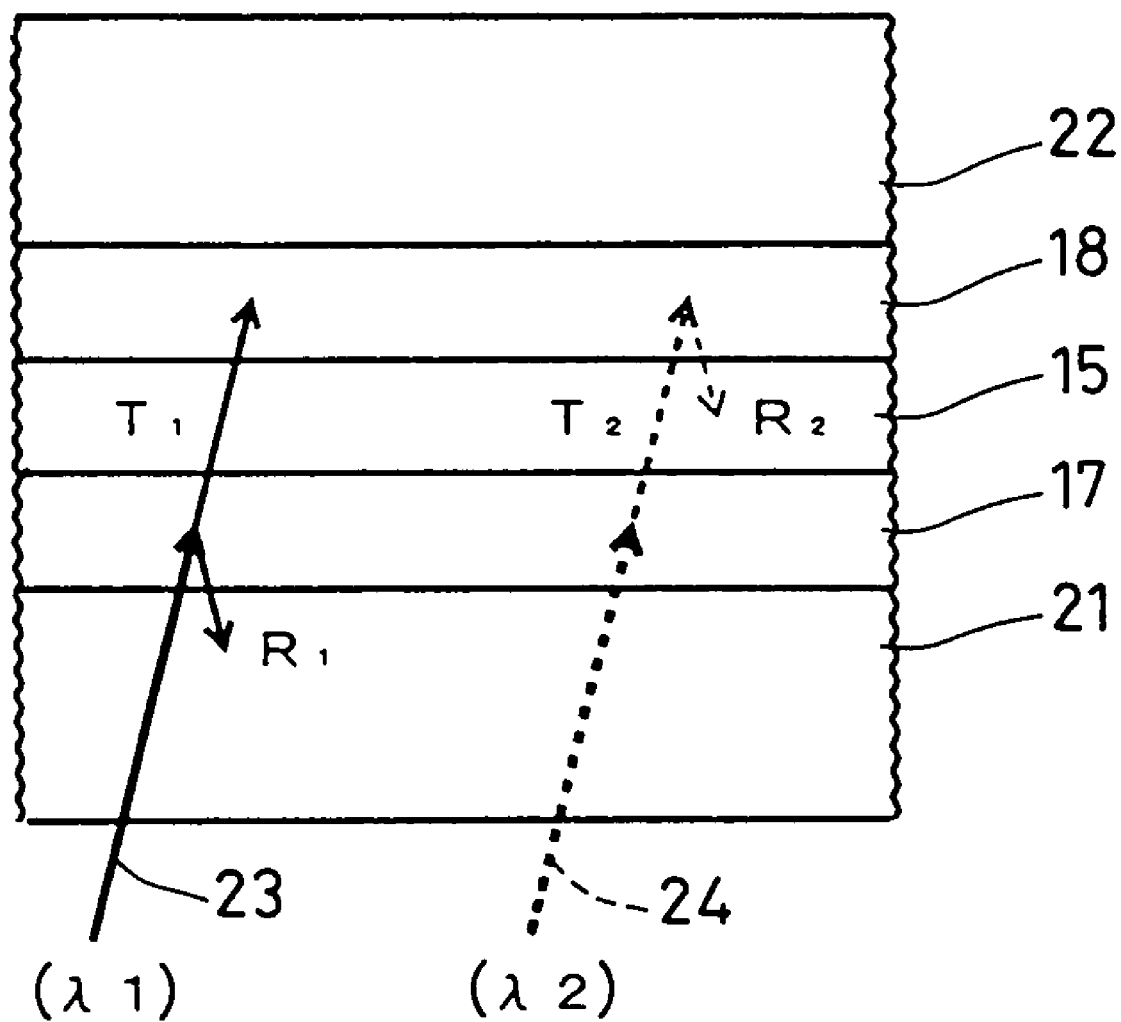
FIG. 4 is a schematic view illustrating a recording and reproduction method with respect to the optical information recording medium according to the third embodiment of the present invention.

FIG. 4 schematically shows a recording and reproduction method with respect to the optical information recording medium according to the third embodiment of the present invention shown in FIG. 3. For instance, when recording and reproduction are carried out with respect to the optical information recording medium shown in FIG. 3, recording and reproduction with respect to the first recording medium 17 are performed using a first laser beam 23 with a wavelength $\lambda 1$, and recording and reproduction with respect to the second recording medium 18 are performed using a second laser beam 24 with a wavelength $\lambda 2$. In FIG. 4, $R_1$ denotes reflectance of the first recording medium 17 with respect to the wavelength $\lambda 1$, $T_1$ light transmittance of the first recording medium 17 with respect to the wavelength $\lambda 1$, $T_2$ light transmittance of the first recording medium 17 with respect to the wavelength $\lambda 2$, and $R_2$ reflectance of the second recording medium 18 with respect to the wavelength $\lambda 2$. For excellent recording and reproduction with respect to the second recording medium 18, it is desirable to satisfy the condition of $T_2 \geq 45\%$.

The following description is directed to multiwavelength light sources using optical waveguide devices according to the present invention. Such optical waveguide devices are optical wavelength conversion elements using a nonlinear optical effect and are characterized by the following three aspects.

A plurality of injection parts are provided for injecting beams into the waveguides of the optical waveguide device from a plurality of coherent light sources.

Optical waveguides with different phase matching conditions are provided to allow phase matching conditions to be satisfied with respect to the plurality of coherent light sources.

Emission parts for irradiating beams with converted wavelengths are provided and are positioned at substantially the same position to improve the focusing property of the emitted beams.

FIFTH EMBODIMENT

Figure 5:
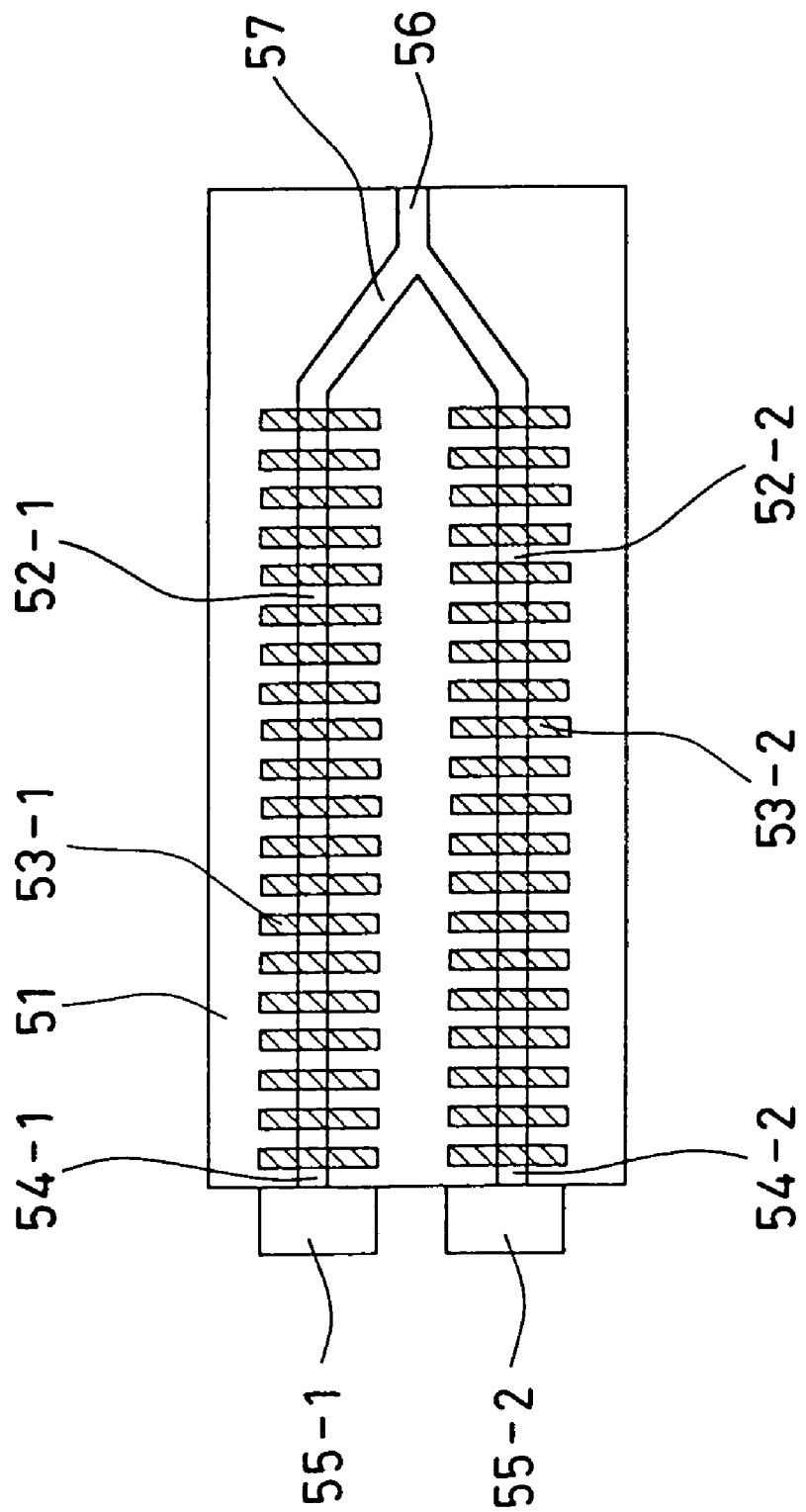
FIG. 5 is a plan view showing a configuration of a multiwavelength light source using a first optical waveguide device of the present invention, which can be applied to the optical information recording media according to the first to third embodiments of the present invention.

FIG. 5 is a plan view illustrating the configuration of a multiwavelength light source using a first optical waveguide device of the present invention, which can be applied to the optical information recording media according to the first to third embodiments of the present invention. In FIG. 5, two optical waveguides 52-1 and 52-2 formed on a substrate 51 are joined using a Y-branch waveguide 57 in the vicinity of an emission part 56 to form a single waveguide, thus forming a second harmonic generation (SHG) element. For the optical waveguides 52-1 and 52-2, polarization inversion structures 53-1 and 53-2 with different periods are formed, respectively. Fundamental waves emitted from semiconductor lasers 55-1 and 55-2 are coupled to injection parts 54-1 and 54-2 of the optical waveguides 52-1 and 52-2 and their wavelengths are converted by the polarization inversion structures 53-1 and 53-2. Then, they join together through the Y-branch waveguide 57 to be emitted from the emission part 56.

The emission wavelengths of the semiconductor lasers 55-1 and 55-2 are 820 nm and 840 nm, respectively. The polarization inversion periods are adjusted so as to achieve phase matching with the respective wavelengths. Beams with converted wavelengths have wavelengths of 410 nm and 420 nm and are emitted from the emission part 56. Thus, as a light source, a multiwavelength light source is obtained, which emits beams with four wavelengths including the beams with respective fundamental waves of 820 nm and 840 nm and beams with converted wavelengths of 410 nm and 420 nm from the single emission part 56. In addition, modulation of the semiconductor lasers enables modulation of beams to be emitted and control for allowing beams only on one side to be emitted or the like. Since emitted beams with different wavelengths are emitted from the single emission part 56, the beams of the light sources emitted from a single point are obtained and thus can be focused within the diffraction limit by a lens system with a symmetrical structure in which chromatic aberration correction has been made.

Generally, when a multiwavelength light source is used, a plurality of light sources are required and the intervals between their respective emission points are considerably wide. Even when the multiwavelength light source is formed by integration of semiconductor lasers, intervals of at least 100 µm are required. When simply a plurality of semiconductor lasers are brought into contact with one another and then are fixed, intervals of several hundreds of micrometers are required. Furthermore, semiconductor lasers with a multi-stripe structure also have been reported, in which a plurality of emission points of the semiconductor lasers are formed on the same substrate. Even in this case, the emission points are spaced at intervals of several tens of micrometers. In the semiconductor lasers with the multi-stripe structure, since epitaxy in the waveguides is uniform, it is difficult to control the emission wavelengths of the semiconductor lasers freely, thus causing difficulty in setting the difference in wavelength between adjacent emission points to be at least several tens of nanometers.

Moreover, when short-wavelength beams in a 400-nm band are to be generated, a GaN semiconductor laser is required. In the state of the art, however, a GaN multi-stripe laser has not been achieved yet. Currently, in a GaN laser with which a successful result in a room-temperature continuous-wave operation has been obtained, its emission wavelength is limited to about 400 nm±10 nm and the increase in the range of the emission wavelength causes deterioration in reliability or the like, which is a problem. In addition, since crystal growth is difficult, it is difficult to form active layers for different wavelengths to be positioned adjacent to a substrate. In other words, it is extremely difficult to generate a plurality of emission wavelengths from a single emission part or adjacent emission parts by the semiconductor laser in the state of the art. Furthermore, with respect to a blue range of a 400-nm wavelength band, it is further difficult to generate beams with different wavelengths from a single emission part or adjacent emission parts.

On the other hand, when using the multiwavelength light source of the present invention, beams with a plurality of wavelengths in the 400-nm band of the blue range can be emitted easily from a single optical waveguide device by a wavelength conversion technique. The emission wavelengths of currently commercially available semiconductor lasers are about 780 to 880 nm in AlGaAs based types and about 630 to 680 nm in AlGaInP based types. When using them, second harmonics of 390 to 440 nm and 315 to 340 nm can be generated, and therefore the emission wavelengths of the multiwavelength light source can be selected freely according to the combinations of such lasers. Moreover, when using another semiconductor laser, the choice of the emission wavelengths is increased further.

Figure 6:
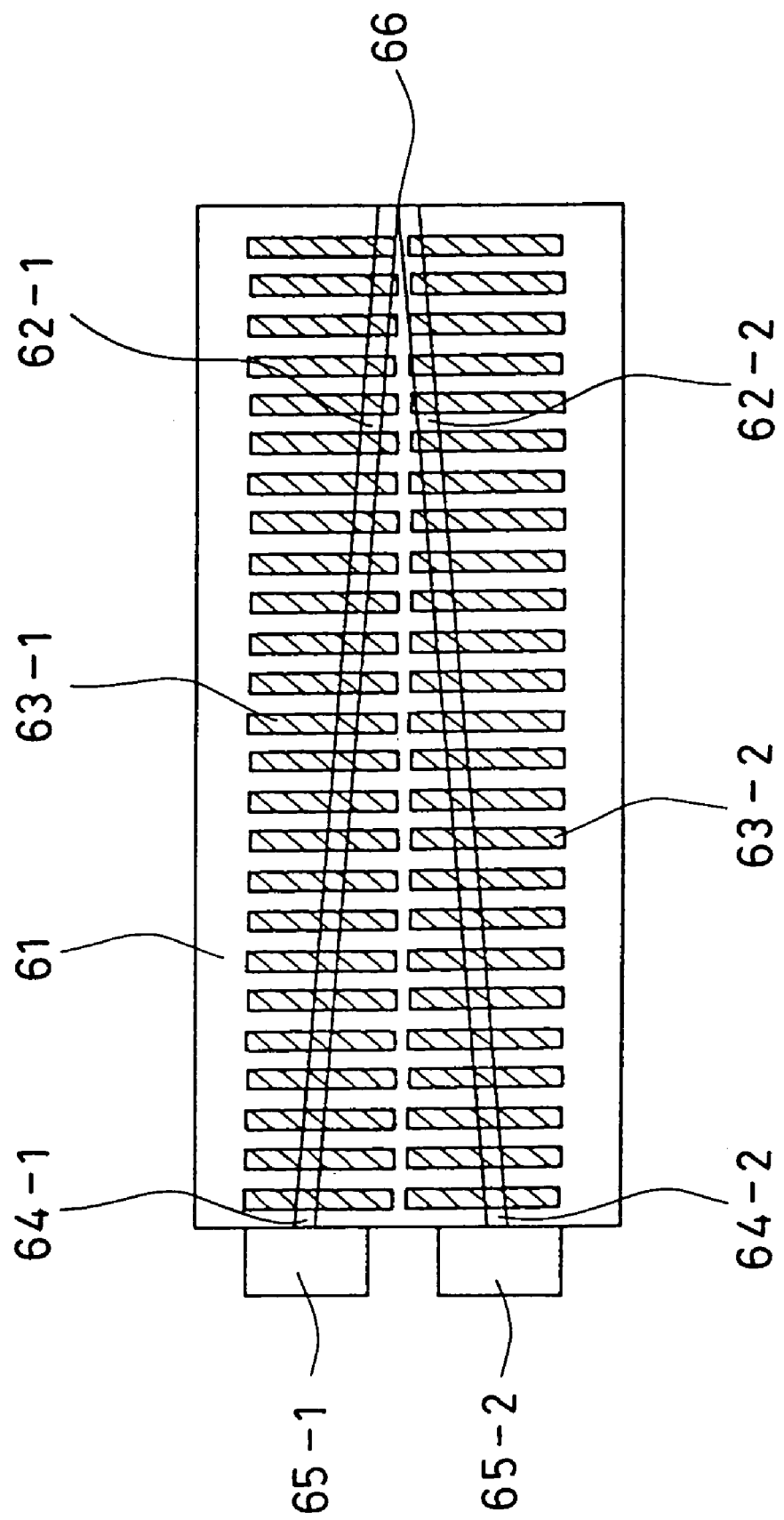
FIG. 6 is a plan view showing a configuration of a multiwavelength light source using a second optical waveguide device of the present invention, which can be applied to the optical information recording media according to the first to third embodiments of the present invention.

FIG. 6 is a plan view illustrating the configuration of a multiwavelength light source using a second optical waveguide device of the present invention, which can be applied to the optical information recording media according to the first to third embodiments of the present invention. In FIG. 6, two optical waveguides 62-1 and 62-2 formed on a substrate 61 are formed as oblique linear waveguides, and they are ended at respective emission parts 66 whose positions are slightly different from each other. For the optical waveguides 62-1 and 62-2, polarization inversion structures 63-1 and 63-2 having different periods are formed. Fundamental waves emitted from semiconductor lasers 65-1 and 65-2 are coupled to injection parts 64-1 and 64-2 of the optical waveguides 62-1 and 62-2, respectively, and their wavelengths are converted by the polarization inversion structures 63-1 and 63-2. After that, they are emitted from the emission parts 66.

As the configuration of the multiwavelength light source, one using the oblique linear waveguides shown in FIG. 6 also is effective. When the Y-branch waveguide 57 shown in FIG. 5 is formed, in order to reduce the propagation loss due to the bent waveguides in the Y-branch portion, the curvature of the waveguides is required to be set as low as possible. Consequently, the Y-branch portion is required to have a length of at least 1 mm, and therefore the length of the optical waveguide device has to be increased to 1.1 or 1.2 times that in the configuration shown in FIG. 6. In addition, propagation constants of the bent waveguide forming the Y-branch and the optical waveguides in the branched parts are slightly different, and therefore, it is difficult to operate the wavelength conversion by polarization inversion under the same conditions as those for the linear waveguide portions, thus causing the difficulty in wavelength conversion in those parts. On the other hand, when using the oblique linear waveguides shown in FIG. 6, substantially the whole length of the optical waveguides 62-1 and 62-2 can be used for the wavelength conversion. In this case, therefore, a light source with higher efficiency can be obtained as compared to that of the configuration shown in FIG. 5.

Further, it also is possible to set the emission parts of the optical waveguides at slightly different positions to a degree to which no aberration is caused by a collective lens. Practically, the emission parts can be spaced at an interval of a few micrometers. When a single emission part is to be used, the optical waveguides are required to have a Y-branch structure, thus requiring a design causing no guided wave loss at portions approaching each other. Positioning of slightly spaced optical waveguides facilitates the waveguide design and the loss caused when the optical waveguides join together can be reduced.

As semiconductor lasers serving as fundamental-wave light sources, light sources having a wavelength conversion function are desirable. Since a tolerance of QPM-SHG with respect to the phase matching wavelength is a small tolerance of about 0.1 nm, precise wavelength control is required for high efficiency wavelength conversion. Therefore, the wavelengths of the semiconductor lasers are controlled to be matched with phase matching wavelengths, thus enabling the high efficiency wavelength conversion. The semiconductor lasers used have a configuration including a DBR (Distributed Bragg Reflector) grating part in the optical waveguide portion. With a heater formed in the DBR grating part, wavelengths reflected by the DBR grating are adjusted, thus controlling the emission wavelengths of the semiconductor lasers. The variable range of the wavelengths is about 2 nm. The use of the laser capable of changing the wavelengths enables the high efficiency wavelength conversion. Even when the phase matching wavelengths are varied due to the variation in ambient temperature, stable outputs can be obtained continually by the control of the emission wavelengths of the semiconductor lasers. Furthermore, in the multiwavelength light source, the control of the phase matching wavelength also enables switching of beams to be emitted. For instance, when the emission wavelengths of the semiconductor lasers are slightly changed, the output of second harmonics can be reduced to be zero, thus allowing free selection of beams to be emitted.

In the multiwavelength light source of the present invention, as an output modulation system, one in which the outputs of the semiconductor lasers or the emission wavelengths are modulated was employed. As another example of the modulation system, an output modulation function can be integrated in an optical wavelength conversion element. The optical wavelength conversion element includes optical waveguides. Since the highly nonlinear material has a high electro-optic constant, a SHG output can be modulated by integrating an electrode structure on the optical waveguides and applying voltage to it to change the refractive indexes of the optical waveguides. The output modulation by the SHG element enables stable output modulation as compared to the output modulation in the semiconductor lasers and thus is effective. This is because the output modulation in the semiconductor lasers causes slight variations in emission wavelengths of the semiconductor lasers according to the variation in the output.

As the semiconductor lasers, multi-beam semiconductor lasers with a plurality of active layers on a single substrate also can be used. By now, two-beam and three-beam lasers have been used practically, and a plurality of semiconductor lasers can be integrated on a single substrate. It also is possible to produce a semiconductor laser in which lasers with different emission wavelengths are integrated. When using a multi-beam semiconductor laser, the positional precision of the semiconductor laser to the emission parts is improved, thus facilitating the alignment between the semiconductor laser and the optical waveguide device. In order to couple a plurality of semiconductor lasers to the optical waveguide device, precise alignment of the respective semiconductor lasers is required. In the case of the integrated semiconductor laser, however, the alignment is required only once. Consequently, the alignment process is facilitated and the time required for the production of a multiwavelength light source can be shortened. In addition, the interval between respective injection parts also can be reduced. In the case of using semiconductor lasers different from each other, when consideration also is given to the size of a semiconductor laser chip, the intervals between the respective injection parts are increased to a few hundreds of micrometers, in proportion to which the width of the waveguide device also increases. On the other hand, when the intervals between the respective injection parts are wide, the length of the Y-branch portions is increased so as to reduce the distance between the waveguides. As a result, the size of the optical waveguide device is increased to 1.1 to 1.2 times in its length direction. On the other hand, in the case of the integrated semiconductor laser, the intervals between emission beams are about a few tens of micrometers and the interval between respective injection parts of the optical waveguide device can be reduced to be one tenth or less. Consequently, the device size can be reduced to be about 50% in area ratio, thus considerably reducing the cost of substrate materials to half.

The descriptions in the present embodiment were directed to the case using two semiconductor laser sources, but the same configuration can be obtained even when using a larger number of semiconductor lasers. When a number of semiconductor lasers are used, a multiwavelength light source with many emission wavelengths can be obtained.

The multiwavelength light source of the present invention also is advantageous for preventing lights from returning to the semiconductor lasers. In the semiconductor laser, when emitted beams return into a resonator, problems such as mode multiplication, noise generation, or the like are caused, thus deteriorating the coherence of beams. On the other hand, when wavelengths are converted to harmonics using the optical waveguide device and harmonic components are utilized, light returning to the semiconductor lasers is converted to harmonics. Consequently, the resonator hardly is affected by noise. Furthermore, when the device configuration is suitably designed, fundamental waves returning to the semiconductor lasers from the optical waveguide device can be reduced, thus obtaining more stable output characteristics. Preferably, for the injection and emission parts of the optical waveguides, anti-reflection films corresponding to the wavelengths of the fundamental waves are provided. In the emission parts, an anti-reflection film of a multilayer film is used to broaden the wavelength range with which the anti-reflection film can cope, since fundamental waves with two wavelengths are present. It is further preferred to accumulate anti-reflection films capable of preventing reflection of both the fundamental waves and harmonics. This can reduce the reflection loss of the harmonic outputs, thus increasing the outputs by over 10%.

Furthermore, the emission parts may be formed obliquely to the direction in which the waveguides travel. When the emission parts are tilted in an in-plane direction of the substrate by about 4°, the reflected lights returning to the semiconductor lasers from the emission parts can be reduced to be one hundredth or less, thus enabling a stable operation.

When the line normal to a surface opposing the substrate in the emission parts is tilted to the substrate surface by about 45°, the emitted beams can be extracted from the upper or back surface of the substrate. Consequently, the integration of a grating, a detector, or the like to the surface of the substrate is facilitated, thus obtaining a small integrated light source.

Next, the following description is directed to the configuration of a multiwavelength light source using another optical waveguide device of the present invention.

As another configuration for converting wavelengths of beams from a plurality of light sources, in addition to the structure in which the wavelengths of beams from a plurality of light sources are converted and then the beams join together in one optical waveguide as described above, there also is a method in which initially a plurality of beams are allowed to join together and then their wavelengths are converted.

Figure 7:
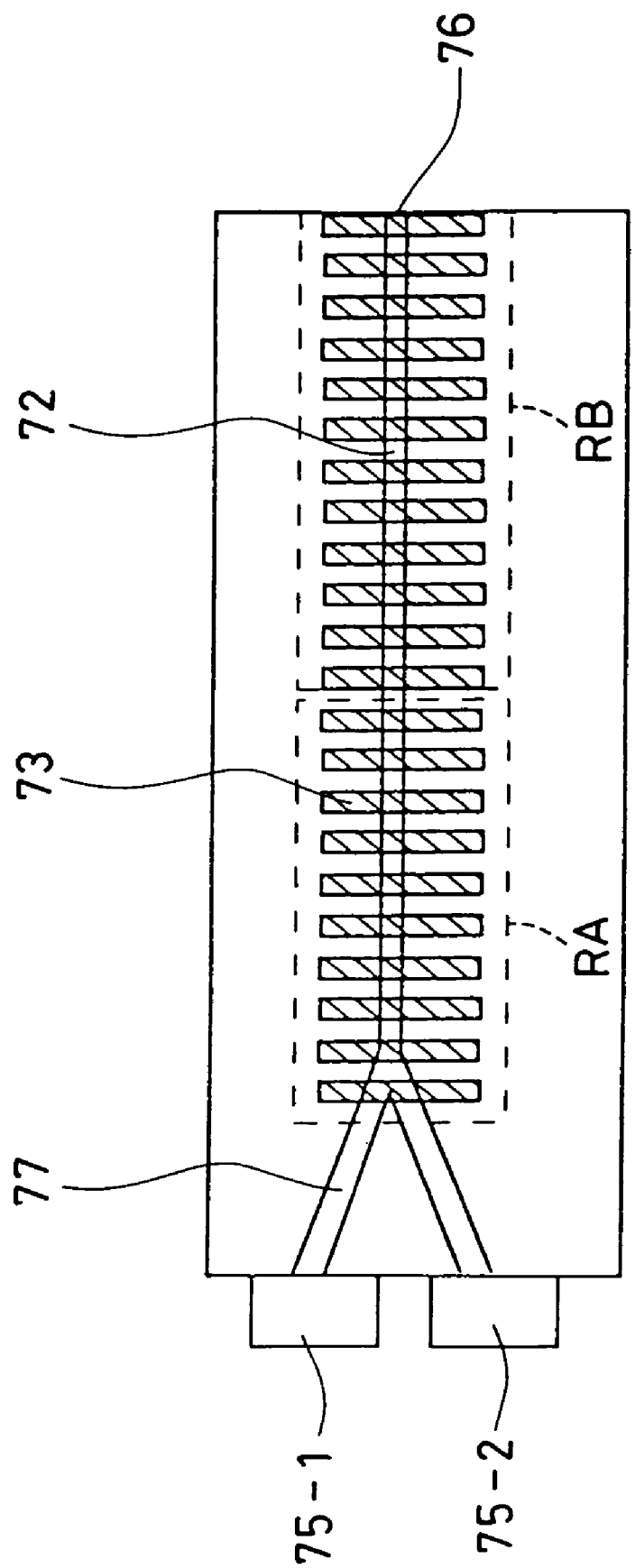
FIG. 7 is a plan view showing a configuration of a multiwavelength light source using a third optical waveguide device of the present invention, which can be applied to the optical information recording media according to the first to third embodiments of the present invention.

FIG. 7 is a plan view illustrating the configuration of a multiwavelength light source using a third optical waveguide device of the present invention, which can be applied to the optical information recording media according to the first to third embodiments of the present invention. In FIG. 7, beams from the semiconductor lasers 75-1 and 75-2 join together and are guided to a single optical waveguide 72 through a Y-branch waveguide 77, and then are emitted from an emission part 76. The optical waveguide 72 is provided with a polarization inversion structure 73 with periodicity and converts the wavelengths of the guided waves. The polarization inversion structure 73 is divided into a plurality of regions (a region RA and a region RB in FIG. 7), which have polarization inversion periods corresponding to the respective wavelengths of the semiconductor lasers 75-1 and 75-2. As conditions for phase matching by the polarization inversion, the difference between phase matching wavelengths is required to be at least 1 nm. When the condition of the phase matching wavelength is decreased below 1 nm, the phase matching characteristics interfere with each other and the variations in SHG output characteristics with respect to the wavelengths increase.

Furthermore, in addition to the polarization inversion regions having the phase matching conditions with respect to the second harmonics, when a polarization inversion region satisfying phase matching conditions with respect to a sum frequency is added, the number of emission wavelengths can be increased further.

There has been a problem that the division of the polarity inversion region reduces the length of the waveguide used for phase matching, resulting in a decrease in conversion efficiency. In this case, it is effective to use the optical waveguides being reflected and folded back by end faces of the substrate. On the end faces, reflection films are formed. When using a directional coupler, 100% of reflected light can be guided to the other waveguide (i.e. the folded-back part of the waveguide). When using reflectors, long optical waveguides can be formed without increasing the area of the substrate, resulting in high efficiency wavelength conversion.

Figure 8:
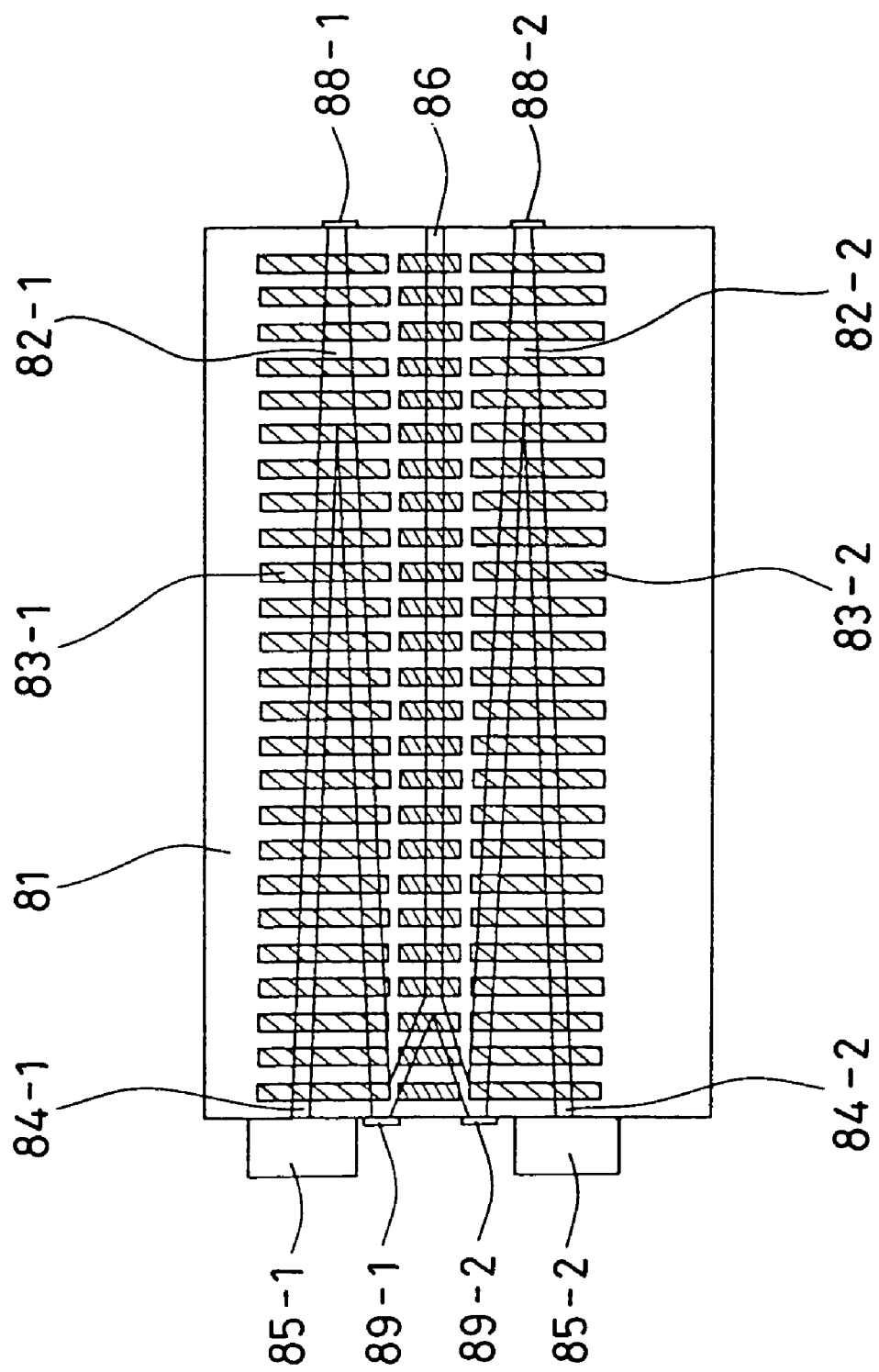
FIG. 8 is a plan view showing a configuration of a multiwavelength light source using a fourth optical waveguide device of the present invention, which can be applied to the optical information recording media according to the first to third embodiments of the present invention.
Figure 9:
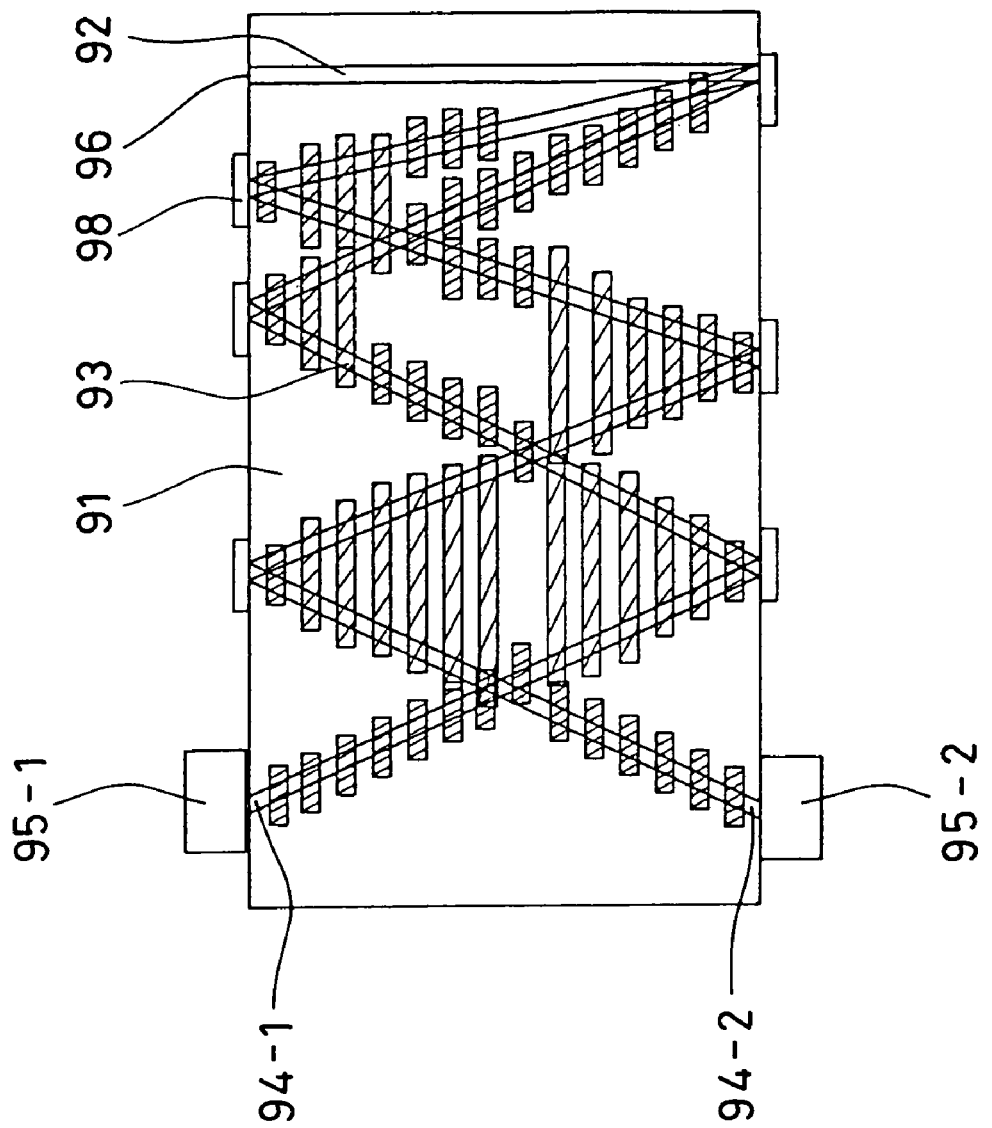
FIG. 9 is a plan view showing a configuration of a multiwavelength light source using a fifth optical waveguide device of the present invention, which can be applied to the optical information recording media according to the first to third embodiments of the present invention.

Other configurations using reflectors also can be produced. As shown in FIGS. 8 and 9, optical waveguides are folded back using reflectors to increase the effective length of the optical waveguides, thus increasing the efficiency. Consequently, the substrate can be used effectively.

FIG. 8 is a plan view illustrating the configuration of a multiwavelength light source using a fourth optical waveguide device of the present invention, which can be applied to the optical information recording media according to the first to third embodiments of the present invention. This fourth optical waveguide device is characterized in that reflectors 88-1, 88-2, 89-1, and 89-2 are provided on the waveguide end faces.

In FIG. 8, a beam emitted from the semiconductor laser 85-1 enters from an injection part 84-1 and propagates through an optical waveguide 82-1, and its wavelength is converted to its second harmonic by a polarization inversion structure 83-1. Similarly, a beam emitted from a semiconductor laser 85-2 enters from an injection part 84-2 and propagates through an optical waveguide 82-2, and its wavelength is converted to its second harmonic by a polarization inversion structure 83-2. Since the conversion efficiency with which the beams are converted into their second harmonics is a few tens of percent or lower, beams that are emitted from the semiconductor lasers 85-1 and 85-2 and whose wavelengths are not converted to their second harmonics are reflected by the reflectors 89-1 and 89-2 to join together in the center optical waveguide. Then, two wavelengths of beams emitted from the semiconductor lasers 85-1 and 85-2 are converted to a sum frequency in the center optical waveguide. From the emission part 86 of the optical waveguide, beams with five wavelengths including two fundamental waves from the two semiconductor lasers 85-1 and 85-2, second harmonics of the respective fundamental waves, and the sum frequency of the two fundamental waves can be extracted in total.

According to this configuration, the optical waveguides folded back are used and therefore a long interaction length can be obtained, thus increasing the efficiency. In addition, this configuration has an advantage that the second harmonics and the sum frequency can be extracted simultaneously.

FIG. 9 is a plan view illustrating the configuration of a multiwavelength light source using a fifth optical waveguide device of the present invention, which can be applied to the optical information recording media according to the first to third embodiments of the present invention. This fifth optical waveguide device is characterized in that a long interaction length is obtained using a number of reflectors 98.

In FIG. 9, beams emitted from semiconductor lasers 95-1 and 95-2 enter optical waveguides from injection parts 94-1 and 94-2, respectively, and their wavelengths are converted by a polarization inversion structure 93. The reflectors 98 provided on end faces of the waveguides reflect guided waves propagating through the optical waveguides many times. The use of the number of reflectors 98 allows the length of the optical waveguides to be increased without increasing the area of a substrate 91, thus enabling the interaction length to be increased. Two beams join together in the optical waveguide 92, and are emitted from the emission part 96.

SIXTH EMBODIMENT

The following description is directed to an optical system using such multiwavelength light sources as described in the fifth embodiment.

Figure 10:
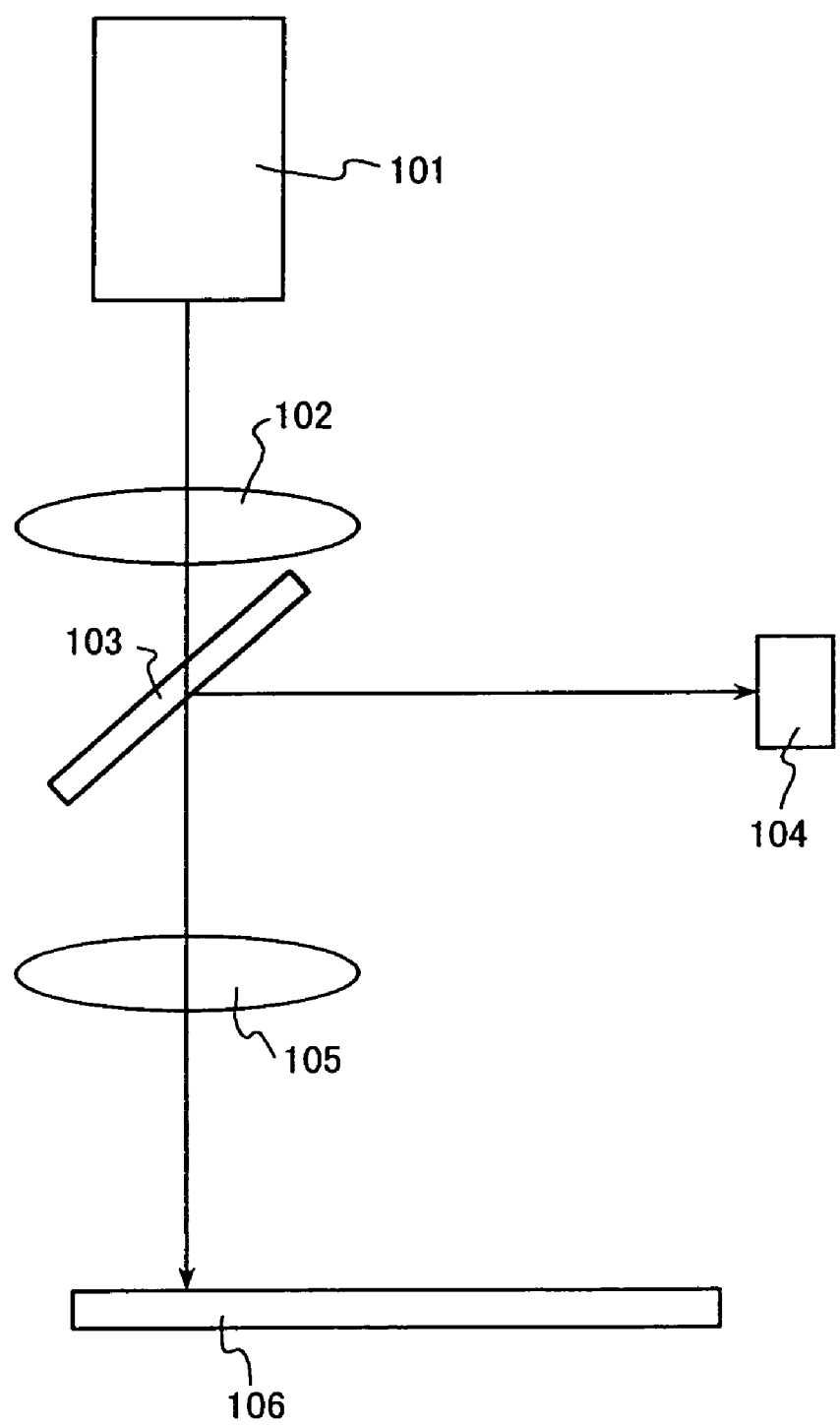
FIG. 10 is a schematic structural view of an optical system provided with a multiwavelength light source using any one of the first to fifth optical waveguide devices according to the present invention.
Figure 11:
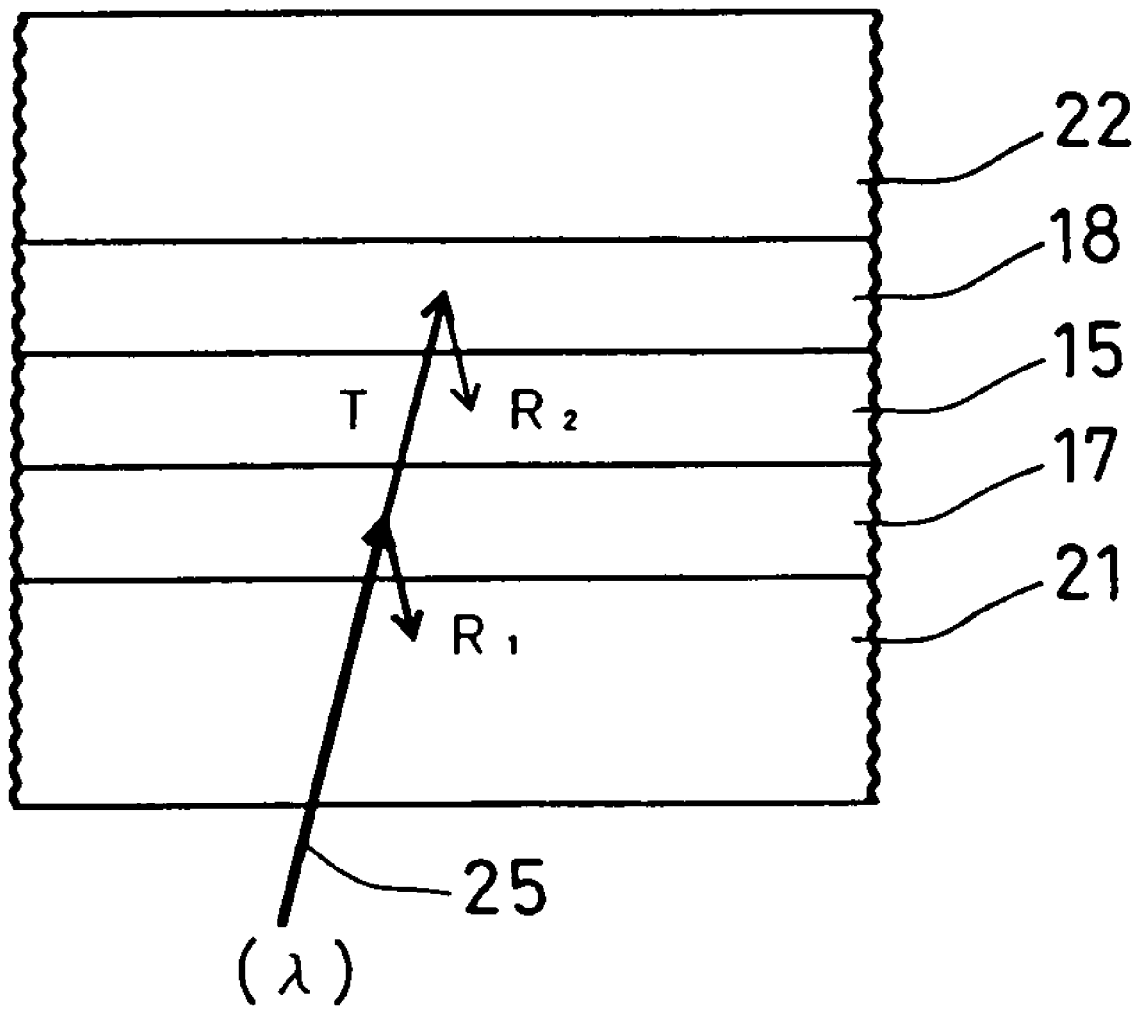
FIG. 11 is a schematic view illustrating a conventional recording and reproduction method with respect to a dual-layer optical information recording medium.

FIG. 10 shows a schematic structural view of an optical system using a multiwavelength light source according to the present invention. Beams emitted from a multiwavelength light source 101 are collimated by a collimator lens 102 and then pass through a filter 103, which are focused by a focusing optical system 105 on an optical information recording medium 106 such as described in the first to third embodiments. Reflected light from the optical information recording medium 106 is reflected by the filter 103 and is detected by a photodetector 104. Consequently, signals recorded in the optical information recording medium 106 are detected and thus information can be read.

The optical system using a multiwavelength light source of the present invention is characterized in that the same simplified optical system as that used in a conventional single wavelength light source can be used. When a plurality of semiconductor lasers are combined to construct a multiwavelength light source, emission points of the light sources are spaced at intervals of about a few hundreds of micrometers. Therefore, when beams are focused by the collimator lens and the collective lens, great aberration is caused and it becomes difficult to focus the beams within the diffraction limit. Therefore, it is required to use a special collective lens or to insert a grating element or the like for aberration correction in the optical system. Consequently, high precision is required for optical adjustment. The optical system of the present invention is excellent in convenience of the optical system and easiness of optical adjustment and is highly effective for the application of a multiwavelength light source with short wavelengths.

Next, the following description is directed to an optical recording with respect to an optical information recording medium using the multiwavelength light source of the present invention. The use of an optical information recording medium with different sensitivities with respect to different wavelengths and a multiwavelength light source enables high density recording by wavelength multiplex. Using media having a hole burning effect as the optical information recording medium, the media having different sensitivities with respect to different wavelengths are accumulated in a layered form, which enables recording and reproduction using different wavelengths with respect to the respective layers, thus achieving optical recording in a multilayer film. Similarly when using the wavelength multiplex, it is important to shorten recording wavelengths. When a light source with short wavelengths is used, the recording density in each wavelength can be increased, thus facilitating the high density recording. When using a light source with short wavelengths, beams with different wavelengths are used to increase recording density considerably. For instance, when three light sources with different wavelengths are integrated at 20 nm intervals, wavelength multiplex recording is possible with respect to three wavelengths.

When using wavelength dispersion, simultaneous recording with respect to a multilayer film is possible. For example, using a light source with two wavelengths and dispersion characteristics of the focusing optical system, focal points of beams with respective wavelengths are set to be different in depth. Using a dual-layer recording medium, two beams with different wavelengths are set to be focused in the respective layers according to the thicknesses of respective recording layers in the recording medium. When the respective beams are modulated separately, different recording can be carried out with respect to the two layers of the recording medium simultaneously. The simultaneous recording with respect to the two layers doubles a recording rate and a readout rate, thus obtaining an optical system for high speed recording and reproduction.

Furthermore, when using an interference filter, beams for first and second layers can be separated easily. Two recording layers are formed with an interference filter being sandwiched therebetween and two wavelengths are separated by the interference filter. In other words, two beams with different wavelengths reach the first recording layer but only one of the two beams with different wavelengths reaches the second layer due to the interference filter. This can reduce the influence on the recording film in the second layer in recording and reproduction with respect to the recording film in the first layer. When two wavelengths are to be separated by the interference filter, it is preferable that the difference between two wavelengths is at least 10 nm. This is because the separation ratio increases with the increase in the difference between the wavelengths to be separated by the interference filter and the decrease in the difference between the wavelengths to be separated increases the number of layers in the multilayer film of the interference filter, thus increasing the film thickness. When the film thickness of the interference filter increases, the aberration of beams passing through the interference filter increases, thus causing a problem of deterioration in focusing characteristics.

Furthermore, when using a multiwavelength light source, not only can the wavelengths of the harmonics be multiplied, but also fundamental waves can be utilized. As described above, the multiwavelength light source emits both the harmonics and fundamental waves. Therefore, the fundamental waves also can be used. It is difficult to use short-wavelength beams for recording and reproduction with respect to CD, CDR, CD-RW, or the like as the currently used recording medium. Particularly with respect to CD-R and CD-RW, short-wavelength beams cannot be used due to the film absorption. On the other hand, when using beams with fundamental waves, it becomes easy to cope with CD-R, CD-RW, or the like. In other words, an optical system enabling not only high density recording and reproduction but also the recording and reproduction with respect to the currently used optical information recording media is obtained using one multiwavelength light source.

SEVENTH EMBODIMENT

Next, another optical system using a multiwavelength light source is described as follows.

In a currently used light source for phase-change optical recording, three light intensity levels, i.e. three levels of a reproduction level, an erase level, and a recording level, are switched. The light intensity is set to the reproduction level for readout of an address and recorded contents of a recording layer, is set to the erase level for erasure of the recorded contents, and is set to the recording level for writing of new recording contents. Therefore, in the light source, its outputs are switched at a high speed between the reproduction level and the erase level and between the reproduction level and the recording level. In this case, however, there has been a problem that the write time in optical recording is increased, since it takes time to switch the outputs of the light source and to stabilize the output.

On the other hand, when an optical system using a multiwavelength light source of the present invention is employed, reproduction and recording are performed with different wavelengths and therefore the switching of the outputs of the light source is no longer necessary, thus allowing high speed optical recording. In the optical system, a wavelength filter is inserted before the photodetector 104 in the optical system shown in FIG. 10 to separate two wavelengths, and lights with the respective wavelengths are detected by different photodetectors. One of the beams is used exclusively for reproduction and the other exclusively for recording and erasure, which enables optical recording without requiring the switching of beams. Furthermore, the multiwavelength light source has a single emission point. Therefore, beams with two wavelengths can be focused on a single focal point, thus operating recording and reproduction simultaneously.

In addition, since the recording and reproduction are operated simultaneously, the state of a phase change film with respect to which recording is operated can be observed in real time. Then, this information is fed back, thus improving the recording precision with respect to the phase-change recording film considerably. When the size and shape of pits recorded in a recording medium by beams are changed slightly, recording noise is caused. The limit of recording density is determined as that at which, due to the increased recording noise, reproduction signals cannot be obtained sufficiently. On the other hand, when using the optical system of the present invention, recording can be performed while information of the recording pits is detected. This information is fed back, and thus recording is performed while the intensity of the recording beam and the focal point on an optical information recording medium are controlled, thus allowing the shape of the recording pits to be controlled precisely. In the conventional configuration, the shape of pits can be observed using the recording beam. However, since the recording beam is modulated at a high frequency, the longitudinal mode is multiplied. Consequently, it has been difficult to observe the state of a recording portion with high precision. According to the optical system of the present invention, however, the recording beam is modulated at a high frequency to have multiplied modes as in the conventional system, but the monitoring beam is in the state of CW (continuous wave) emission, thus allowing the state of the recording portion to be observed with low noise.

According to the optical system of the present invention, the recording noise can be reduced considerably and the recording density can be increased. For instance, when using a multiwavelength light source with wavelengths of 410 nm and 420 nm, merely by using the lens for chromatic aberration correction, which prevents the difference in focusing characteristics from being caused by the difference in wavelengths, a focal spot within the diffraction limit can be obtained at a single focal point. This is a characteristic that can be obtained only by a multiwavelength light source having a single emission point. This enabled high density optical recording.

Furthermore, as a recording method, recording can be operated while beams with two wavelengths or many wavelengths are modulated at different modulation levels. In other words, a beam with one of the wavelengths is allowed to have continuous wave (CW) motion and the beam with the other wavelength is modulated at a high frequency. By the combination of them, modulated waveforms can be controlled freely. Since a SHG output increases in proportion to the square of the fundamental wave power, the modulation of input beams allows the SHG outputs to be increased considerably.

The following descriptions are directed to examples of the optical information recording media according to the first to third embodiments of the present invention.

EXAMPLE 1

Initially, complex refractive indexes of the respective layers in the optical information recording medium were calculated using a wavelength of 400 nm experimentally. The materials for the respective layers were selected as follows: ZnS-20 mol % $SiO_2$ for optical interference layers, GeN for interface layers, GeSbTe for recording layers, and a Ag alloy for reflective layers. The optical interference layers of ZnS-20 mol % $SiO_2$ were formed by sputtering of a ZnS-20 mol % $SiO_2$ target in an Ar gas atmosphere using a RF power source. The interface layers of GeN were formed by sputtering of a Ge target in an Ar-nitrogen mixed gas atmosphere using a RF power source. The recording layers of GeSbTe were formed by sputtering of a GeSbTe target in an Ar-nitrogen mixed gas atmosphere using a DC power source. The recording layers were in an amorphous state after the sputtering. Therefore, thin films also were prepared, which were treated with heat in a nitrogen atmosphere using an electric furnace to assume a crystal phase. The reflective layers of the Ag alloy were formed by sputtering of a Ag alloy target in an Ar gas atmosphere using a DC power source. After the respective layers were formed on a quartz substrate, their thicknesses were measured with an instrument for measuring the difference in level and their reflectance and light transmittance with respect to a wavelength of 400 nm were measured with a spectroscope, based on which the complex refractive indexes were calculated. The complex refractive indexes thus obtained are shown in Table 1. For comparison, Table 1 also includes the complex refractive indexes in the case of using a wavelength of 660 nm. The following formula holds: Complex Refractive Index=Refractive Index (n)−Extinction Coefficient (k)×i.

TABLE 1

| Wavelength (nm) | ZnS—SiO$_2$ | GeN | GeSbTe Crystal | Amorphous | Ag Alloy |
|---|---|---|---|---|---|
| 400 | 2.23–0.02i | 2.40–0.17i | 1.76–3.17i | 2.99–1.96i | 0.34–1.90i |
| 660 | 2.10–0.00i | 2.24–0.04i | 4.20–3.90i | 3.90–1.30i | 0.24–4.15i |

From Table 1, it can be seen that when comparing the complex refractive indexes with respect to the wavelengths of 400 nm and 660 nm, ZnS—SiO$_2$ and GeN have relatively low wavelength dependence, but the refractive index of the GeSbTe in a crystal phase and the extinction coefficient of the Ag alloy have high wavelength dependence.

EXAMPLE 2

According to the method of the example 1, the complex refractive indexes of the respective layers with respect to the wavelengths from 390 to 520 nm were calculated and based on the values thus obtained, optical calculation for the multilayer structure of the first recording medium 17 was carried out. The wavelengths in the experimental wavelength range were able to be converted by a SHG element. The multilayer structure of the first recording medium 17 is shown in FIGS. 1 to 3. The thicknesses of the first lower optical interference layer 2 and the first upper optical interference layer 6 are taken as variables, the thicknesses of the first lower interface layer 3 and the first upper interface layer 5 are set to be 5 nm, the thickness of the first recording layer 4 to be 6 nm, and the thickness of the first reflective layer 7 to be 10 nm. As thicknesses of the optical interference layers, which allow greater variation in quantity of reflected light and the highest light absorption ratio in the recording layers in a crystal state and in an amorphous state to be obtained, a combination of the first lower optical interference layer 2 with a thickness of 36λ/64n (nm) and the first upper optical interference layer 6 with a thickness of 12λ/64n (nm) was selected. Table 2 shows the results of optical calculations of the light absorption ratio Ac/Aa and light transmittance Tc and Ta of the first recording layer 4 in a crystal state and in an amorphous state, respectively, in this configuration.

TABLE 2

| λ1 (nm) | First Recording Medium | | |
|---|---|---|---|
| | Ac/Aa | Tc (%) | Ta (%) |
| 390 | 1.02 | 57.2 | 49.5 |
| 400 | 1.07 | 55.7 | 48.9 |
| 410 | 1.12 | 54.3 | 48.3 |
| 420 | 1.16 | 52.7 | 47.4 |
| 430 | 1.20 | 51.1 | 46.9 |
| 440 | 1.24 | 49.8 | 46.3 |
| 450 | 1.28 | 48.3 | 45.7 |
| 470 | 1.36 | 45.3 | 45.0 |
| 500 | 1.48 | 42.0 | 44.5 |
| 520 | 1.55 | 39.8 | 44.1 |

From the results shown in Table 2, it was found that the light absorption ratio Ac/Aa of the first recording medium 17 decreases as the wavelength is shortened, and the light transmittance Tc and Ta increases as the wavelength is shortened.

EXAMPLE 3

Figure 12:
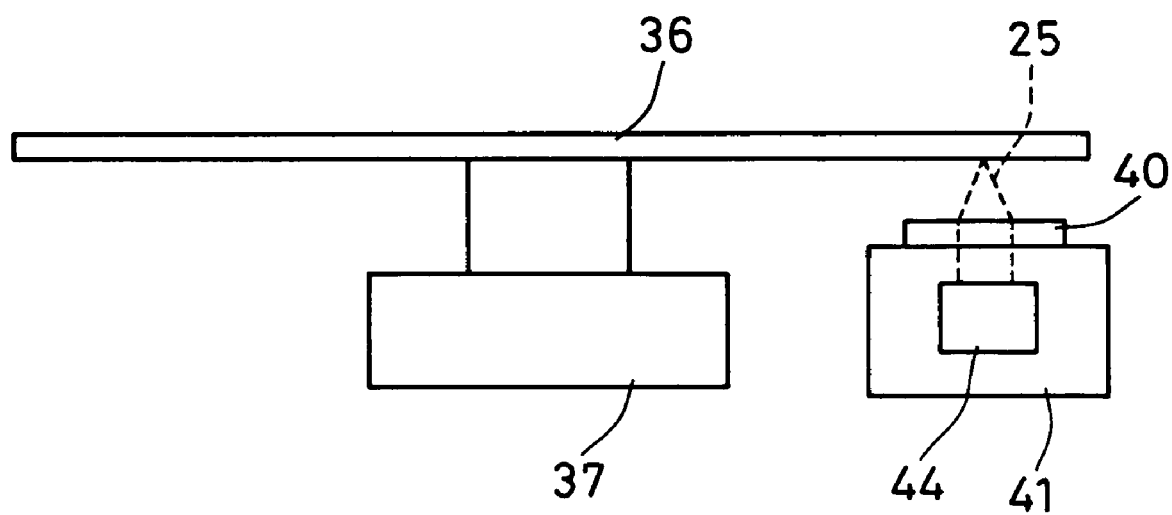
FIG. 12 is a structural view of a system according to the conventional recording and reproduction method with respect to an optical information recording medium.
Figure 13:
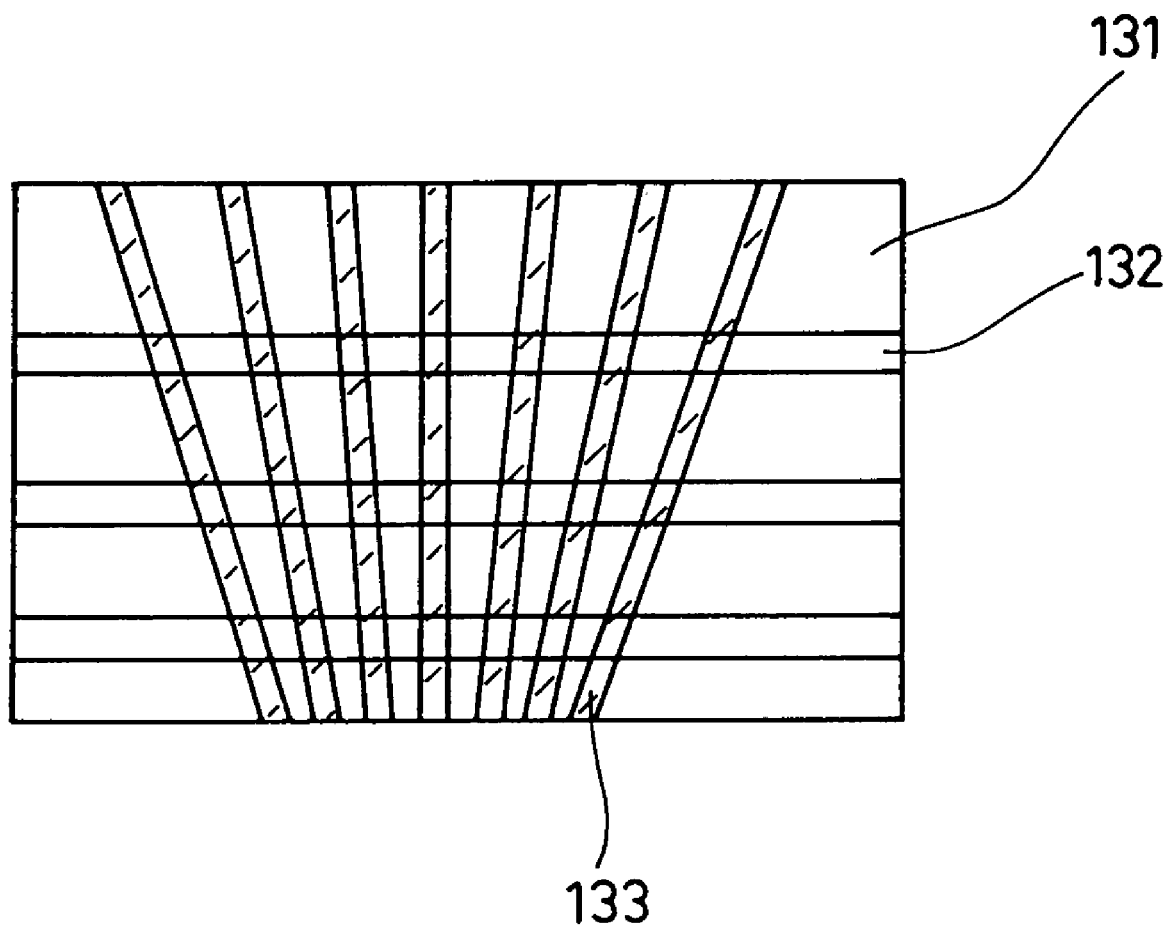
FIG. 13 is a plan view showing a first structural example of a conventional optical waveguide device.
Figure 14:
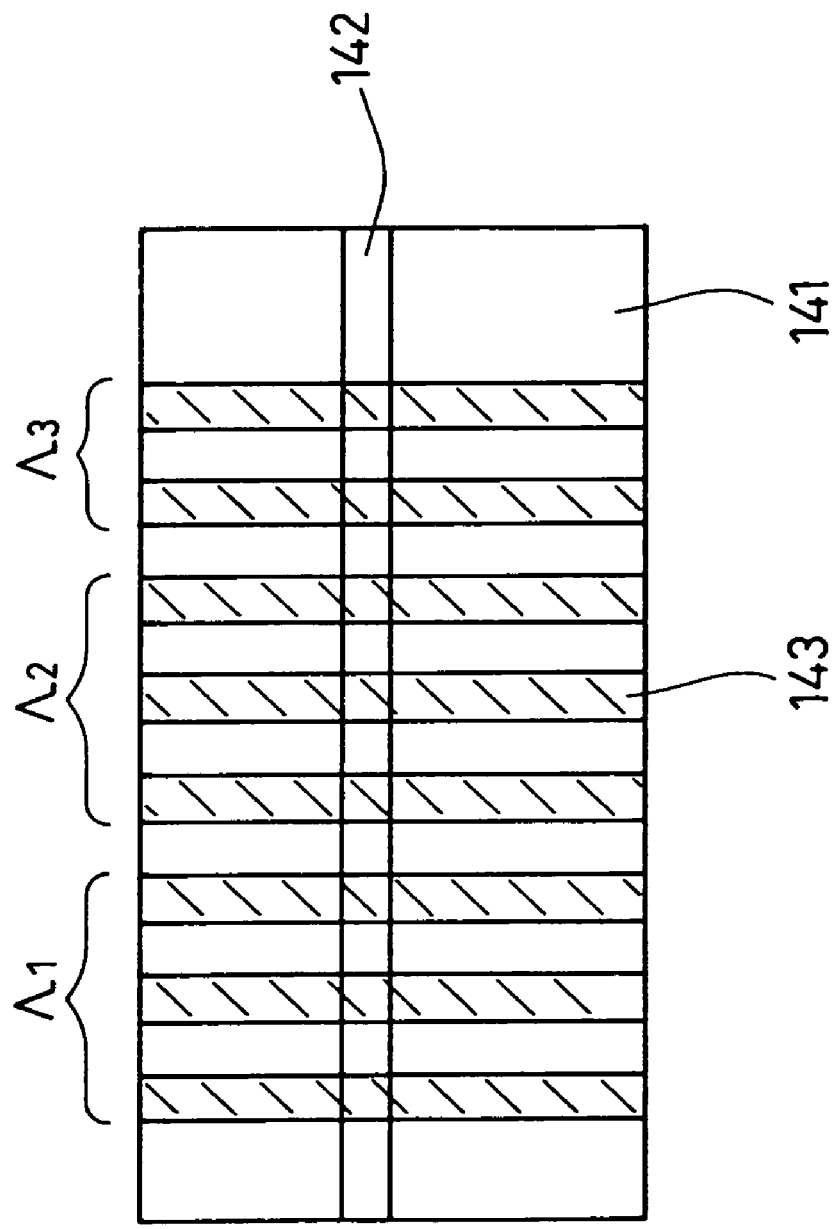
FIG. 14 is a plan view showing a second structural example of a conventional optical waveguide device.

Based on the calculation results in Example 2, the first recording medium 17 and the second recording medium 18 were optically designed with respect to the wavelength λ1. As is described in the first embodiment, nine types of the optical information recording media with the configuration illustrated in FIG. 1 were produced experimentally. Materials of the respective layers in the first recording medium 17 and the second recording medium 18 are the same as those in Example 1. The thicknesses of the respective layers in the second recording medium 18 are designed as follows. The thickness of the second lower optical interference layer 9 formed of ZnS—SiO$_2$ is 6λ/64n (nm), that of the second lower interface layer 10 formed of GeN 5 nm, that of the second recording layer 11 formed of GeSbTe 10 nm, that of the second upper interface layer 12 formed of GeN 5 nm, that of the second upper optical interference layer 13 formed of ZnS—SiO$_2$ 20λ/64n (nm), and that of the second reflective layer 14 formed of a Ag alloy 80 nm. With a single wavelength λ1, CNR (a carrier—noise ratio) and erase rates of the first recording medium 17 and the second recording medium 18 were measured. The measurement was conducted using the system shown in FIG. 12, wherein a drive manufactured by Pulstec Industrial Co., Ltd. was used, into which respective optical heads with different laser wavelengths were loaded and changed. The linear velocity was 5 m/s. The CNR was calculated from signal amplitude and a noise level obtained when a 3T signal was recorded ten times. Subsequently, the 3T signal that had been measured was overwritten once with a 11T signal and the amplitude of the 3T signals was measured. From the difference (decrease) in the amplitudes before and after the overwriting, the erase rate was obtained. The erase rate Ers (dB) of the first recording medium 17 and the recording sensitivity Pp/Pb of the second recording medium 18 were evaluated and the results are shown in Table 3. The recording was operated as a groove recording. The recording sensitivity was defined by peak power Pp (mW) and bias power Pb (mW) when CNR=50 dB.

TABLE 3

| Optical Information Recording Medium (OIRM) No. | λ1 (nm) | First Recording Medium Ers. (dB) | Second Recording Medium Pp (mW)/Pb (mW) |
|---|---|---|---|
| OIRM 01 | 400 | 20 | 11.7/4.9 |
| OIRM 02 | 410 | 24 | 12.0/5.1 |
| OIRM 03 | 420 | 28 | 12.4/5.3 |
| OIRM 04 | 430 | 33 | 12.8/5.4 |
| OIRM 05 | 440 | 36 | 13.1/5.6 |
| OIRM 06 | 450 | 40 | 13.5/5.7 |
| OIRM 101 | 470 | 42 | 13.8/5.8 |
| OIRM 102 | 500 | 44 | 14.0/5.9 |
| OIRM 103 | 520 | 46 | 14.3/6.0 |

From the calculation results in Example 2 shown in Table 2 and the measurement results shown in Table 3, it can be seen that when the light absorption ratio Ac/Aa is at least 1.0, an erase rate of 20 dB is obtained, which makes the optical information recording medium practicable, and when the light absorption ratio Ac/Aa is at least 1.2, an erase rate of at least 30 dB is obtained. Preferably, therefore, the light absorption ratio Ac/Aa is at least 1.20. Consequently, it can be understood that preferably, the first recording medium 17 is recorded or reproduced with a wavelength of at least 430 nm.

With respect to the recording sensitivity of the second recording medium 18, the sensitivity tends to increase as the wavelength λ1 is shortened. This tendency matches with the calculation results in Example 2, and the sensitivity of the second recording medium 18 can be increased with the increase in light transmittance of the first recording medium 17. Therefore, in order to achieve excellent recording and reproduction with respect to the second recording medium 18, shorter recording wavelengths are preferable.

EXAMPLE 4

From the results in Example 3, it was found that further preferable recording wavelengths for obtaining excellent recording and reproduction characteristics were not the same in the first recording medium 17 and the second recording medium 18.

Therefore, it was considered that the first recording medium 17 was recorded and reproduced with a wavelength λ1 and the second recording medium 18 with a wavelength λ2 in the vicinity of the wavelength λ1 as shown in FIG. 4 so that excellent recording and reproduction characteristics were obtained in both the recording media. The first recording medium 17 was optically designed with respect to the wavelength λ1 and has the same configuration as that in Example 2 so as to have the greater variation in quantity of reflected light and the highest light absorption ratio. The light transmittance, of the first recording medium 17 with this configuration, with respect to the wavelength λ2 was optically calculated as in Example 2. Since the design thickness of the first recording medium 17 was determined with respect to the wavelength λ1, the optical length of the optical interference layers varies with respect to the different wavelength λ2. The light absorption ratio of the first recording medium 17 with respect to the wavelength λ1 is the same as that described in Example 2. When $\Delta\lambda=\lambda 1-\|2$, the variations in light transmittance of the first recording medium 17 with respect to Δλ in the case of λ1=520 nm were calculated. The results are shown in Table 4.

TABLE 4

| Δλ (nm) | Tc (%) | Ta (%) |
|---|---|---|
| 10 | 41.2 | 44.4 |
| 20 | 43.5 | 45.4 |
| 30 | 45.2 | 46.4 |
| 40 | 47.0 | 47.2 |
| 50 | 48.6 | 48.2 |
| 70 | 54.9 | 53.0 |
| 100 | 63.3 | 61.6 |
| 120 | 67.0 | 65.4 |

From Table 4, it can be seen that the light transmittance of the first recording medium 17 increases with the increase of Δλ. When λ=520 nm, a light absorption ratio of 1.55 was obtained (Table 2). Consequently, when λ1=520 nm, both a sufficiently high light absorption ratio and high light transmittance were obtained by calculation in the range of 10 nm≦Δλ≦120 nm.

EXAMPLE 5

In this example, the same calculation as that in Example 4 was conducted, but the calculation was conducted as to the case where the values of Δλ and λ1 are smaller, i.e. when 10 nm≦Δλ≦50 nm and λ1=450. The results are shown in Table 5.

TABLE 5

| Δλ (nm) | Tc (%) | Ta (%) |
|---|---|---|
| 10 | 50.3 | 46.8 |
| 20 | 53.3 | 49.1 |
| 30 | 55.6 | 50.8 |
| 40 | 59.5 | 54.4 |
| 50 | 62.9 | 57.8 |

From Table 5, as in Example 4, it can be seen that the light transmittance of the first recording medium 17 increases with the increase of Δλ. When λ1=450 nm, a light absorption ratio of 1.28 was obtained (Table 2). Consequently, both a sufficiently high light absorption ratio and high light transmittance were obtained by calculation. When the values of Δλ and λ1 are small, the recording density can be increased.

EXAMPLE 6

As in Example 4, the variations in light transmittance of the first recording medium 17 with respect to Δλ were calculated, when −120 nm≦Δλ≦−10 nm and λ1=400 nm. The results are shown in Table 6.

TABLE 6

| Δλ (nm) | Tc (%) | Ta (%) |
|---|---|---|
| −120 | 37.2 | 48.5 |
| −100 | 38.8 | 47.6 |
| −70 | 42.9 | 46.0 |
| −50 | 47.0 | 47.1 |
| −40 | 49.3 | 47.3 |
| −30 | 50.1 | 46.9 |
| −20 | 51.1 | 46.5 |
| −10 | 53.8 | 48.0 |

From Table 6, the light transmittance of the first recording medium 17 increases with the increase of Δλ. However, the light absorption ratio in the case of λ1=400 nm was about 1.07 (Table 2). Consequently, it can be understood that in view of the values of the light absorption ratio and the light transmittance, the results of this combination is not preferable in practical use as compared to the results in Example 4.

EXAMPLE 7

As in Example 4, the variations in light transmittance of the first recording medium 17 with respect to Δλ in the case of λ1=430 nm were calculated. The results are shown in Table 7.

TABLE 7

| Δλ (nm) | Tc (%) | Ta (%) |
|---|---|---|
| −20 | 46.7 | 45.0 |
| −10 | 49.1 | 45.9 |
| 10 | 53.3 | 48.1 |
| 20 | 56.5 | 50.9 |
| 30 | 58.9 | 52.6 |

From Table 7, it can be seen that the light transmittance of the first recording medium 17 increases with the increase of Δλ. When λ1=430 nm, a light absorption ratio of 1.20 was obtained (Table 2). Consequently, both a sufficiently high light absorption ratio and high light transmittance were obtained in the range of −20 nm≦Δλ≦30 nm. When compared with the results in Example 4, the range of Δλ decreases, but this example is advantageous for the aspect that a higher recording density of the first recording medium 17 can be obtained when λ1=430 nm.

EXAMPLE 8

From the calculation results in Examples 4 to 7, the tendency of wavelength dependence of the light transmittance of the first recording medium 17 when using two wavelengths was obtained. Further preferable wavelength λ1 is in the range between 430 nm and 450 nm and preferably, the wavelength λ2 is shorter than the wavelength λ1. Next, optical information recording media in the present example were produced experimentally. Using two wavelengths λ1 and λ2 to be varied, the CNR and erase rates of the first recording medium 17 and the second recording medium 18 were measured. The measurement was conducted using an optical head for the wavelengths λ1 and an optical head for the wavelengths λ2 loaded and changed in a drive manufactured by Pulstec Industrial Co., Ltd.

As in Example 3, the design thickness of the first recording medium 17 was determined with respect to the wavelength λ1, and that of the second recording medium 18 was determined with respect to the wavelength λ2, thus producing optical information recording media shown in FIG. 1 experimentally. The evaluation results of the erase rate Ers (dB) of the first recording medium 17 and the recording sensitivity Pp/Pb of the second recording medium 18 in each optical information recording medium are shown in Table 8 (λ1=400 nm), Table 9 (λ1=430 nm), and Table 10 (λ1=450 nm). Similarly in this case, groove recording was conducted.

TABLE 8

| Number of Wavelength | Optical Information Recording Medium (OIRM) No. | λ1 (nm) | λ2 (nm) | First Recording Medium Ers. (dB) | Second Recording Medium Pp (mW)/Pb (mW) |
|---|---|---|---|---|---|
| Single | OIRM 01 | 400 | 400 | 20 | 11.7/4.9 |
| 2 | OIRM 07 | 400 | 450 | 20 | 13.9/5.9 |
| 2 | OIRM 08 | 400 | 440 | 20 | 13.3/5.6 |
| 2 | OIRM 09 | 400 | 430 | 20 | 13.0/5.5 |
| 2 | OIRM 10 | 400 | 420 | 20 | 12.8/5.4 |
| 2 | OIRM 11 | 400 | 410 | 20 | 12.1/5.1 |

TABLE 9

| Number of Wavelength | Optical Information Recording Medium (OIRM) No. | λ1 (nm) | λ2 (nm) | First Recording Medium Ers. (dB) | Second Recording Medium Pp (mW)/Pb (mW) |
|---|---|---|---|---|---|
| Single | OIRM 04 | 430 | 430 | 33 | 12.8/5.4 |
| 2 | OIRM 12 | 430 | 450 | 33 | 14.1/5.9 |
| 2 | OIRM 13 | 430 | 440 | 33 | 13.3/5.6 |
| 2 | OIRM 14 | 430 | 420 | 33 | 12.2/5.2 |
| 2 | OIRM 15 | 430 | 410 | 33 | 11.6/4.9 |
| 2 | OIRM 16 | 430 | 400 | 33 | 11.1/4.7 |

TABLE 10

| Number of Wavelength | Optical Information Recording Medium (OIRM) No. | λ1 (nm) | λ2 (nm) | First Recording Medium Ers. (dB) | Second Recording Medium Pp (mW)/Pb (mW) |
|---|---|---|---|---|---|
| Single | OIRM 06 | 450 | 450 | 40 | 13.5/5.7 |
| 2 | OIRM 17 | 450 | 440 | 40 | 13.0/5.5 |
| 2 | OIRM 18 | 450 | 430 | 40 | 12.2/5.2 |
| 2 | OIRM 19 | 450 | 420 | 40 | 11.8/5.0 |
| 2 | OIRM 20 | 450 | 410 | 40 | 10.9/4.6 |
| 2 | OIRM 21 | 450 | 400 | 40 | 10.4/4.4 |

From these measurement results, it was verified that in order to obtain an erase rate of at least 30 dB in the first recording medium 17, λ1≧430 nm is preferable and the recording density of the second recording medium 18 increases with the increase of Δλ. When consideration is given to allowing both the first recording medium 17 and the second recording medium 18 to be recorded with higher recording density, a combination of λ1=430 nm and λ2=400 nm is more preferable.

EXAMPLE 9

In the present example, dual-wavelength recording is conducted using the multiwavelength light source shown in FIG. 5 described in the fifth embodiment. Commercially available semiconductor lasers with wavelengths of 860 nm and 800 nm were coupled to a wavelength conversion element so that wavelengths can be converted to be λ1=430 nm and λ2=400 nm in view of the results in Example 8, thus producing a multiwavelength light source. Using the multiwavelength light source, the recording sensitivity, CNR, erase rates, and jitter values were measured in the grooves and lands of the first recording medium 17 and the second recording medium 18 in the optical information recording medium. Table 11 shows the measurement results in the groove recording and Table 12 shows the measurement in the land recording.

TABLE 11

| First Recording Medium | | | | Second Recording Medium | | | |
|---|---|---|---|---|---|---|---|
| Pp/Pb (mW) (mW) | CNR (dB) | Erase Rate (dB) | Jitter Value (%) | Pp/Pb (mW) (mW) | CNR (dB) | Erase Rate (dB) | Jitter Value (%) |
| 11.6/5.0 | 53 | 32 | 9.6 | 10.3/4.4 | 55 | 32 | 9.1 |

TABLE 12

| First Recording Medium | | | | Second Recording Medium | | | |
|---|---|---|---|---|---|---|---|
| Pp/Pb (mW) (mW) | CNR (dB) | Erase Rate (dB) | Jitter Value (%) | Pp/Pb (mW) (mW) | CNR (dB) | Erase Rate (dB) | Jitter Value (%) |
| 11.8/5.2 | 52 | 30 | 9.9 | 10.8/4.6 | 54 | 30 | 9.3 |

As shown in Tables 11 and 12, the use of the multiwavelength light source allowed excellent recording and reproduction characteristics to be obtained in the first and second recording media. When using the wavelength conversion element, dual-wavelength recording can be operated with one optical head.

EXAMPLE 10

Next, using the optical information recording medium shown in FIG. 3, Example 9 was repeated and similarly, the excellent results were obtained. Table 13 shows the results in the groove recording and Table 14 the results in the land recording.

TABLE 13

| First Recording Medium | | | | Second Recording Medium | | | |
|---|---|---|---|---|---|---|---|
| Pp/Pb (mW) (mW) | CNR (dB) | Erase Rate (dB) | Jitter Value (%) | Pp/Pb (mW) (mW) | CNR (dB) | Erase Rate (dB) | Jitter Value (%) |
| 11.5/5.0 | 52 | 33 | 9.5 | 10.2/4.4 | 54 | 33 | 9.3 |

TABLE 14

| First Recording Medium | | | | Second Recording Medium | | | |
|---|---|---|---|---|---|---|---|
| Pp/Pb (mW) (mW) | CNR (dB) | Erase Rate (dB) | Jitter Value (%) | Pp/Pb (mW) (mW) | CNR (dB) | Erase Rate (dB) | Jitter Value (%) |
| 11.9/5.4 | 52 | 31 | 9.8 | 10.7/4.5 | 54 | 31 | 9.4 |

EXAMPLE 11

In the present example, the optical information recording medium shown in FIG. 2 was produced experimentally and its recording and reproduction characteristics were evaluated. The thickness of the protective layer 20 was 100 μm and the numerical aperture NA of the objective lens was 0.85. The recording density was about 1.4 times as high as that in the case of NA=0.6. The recording and reproduction wavelengths were $\lambda 1=430$ nm and $\lambda 2=400$ nm, and the multiwavelength light source shown in FIG. 5 was used as in Example 9. Laser beams were allowed to be incident from the protective layer 20 side, and the recording sensitivity, CNR, erase rate, jitter value in the groove recording were measured. The results are shown in Table 15.

TABLE 15

| First Recording Medium | | | | Second Recording Medium | | | |
|---|---|---|---|---|---|---|---|
| Pp/Pb (mW) (mW) | CNR (dB) | Erase Rate (dB) | Jitter Value (%) | Pp/Pb (mW) (mW) | CNR (dB) | Erase Rate (dB) | Jitter Value (%) |
| 11.9/5.4 | 50 | 28 | 10.8 | 10.8/4.6 | 52 | 28 | 10.7 |

From Table 15, it can be seen that the recording density was increased, accordingly the CNR and erase rate were decreased slightly, and the jitter value increased by about 1%, which however, is considered as a practical level. Thus, the possibility of the increase in density in the dual wavelength recording also was verified.

EXAMPLE 12

In the present example, as to the case where Ge—Sb—Te—Sn was used for the first recording layer 4 in Example 10, similarly the recording sensitivity, CNR, erase rate, and jitter value were measured. The results are shown in Table 16.

TABLE 16

| First Recording Medium | | | | Second Recording Medium | | | |
|---|---|---|---|---|---|---|---|
| Pp/Pb (mW) (mW) | CNR (dB) | Erase Rate (dB) | Jitter Value (%) | Pp/Pb (mW) (mW) | CNR (dB) | Erase Rate (dB) | Jitter Value (%) |
| 11.9/5.3 | 50 | 33 | 10.0 | 10.8/4.5 | 52 | 33 | 9.9 |

From the results shown in Tables 15 and 16, when using Ge—Sb—Te—Sn, the erase rate was increased by 5 dB.

EXAMPLE 13

In the present example, the thickness of the first recording layer 4 was varied from 3 nm to 15 nm and the same optical calculation as in Example 2 was conducted. The thickness of the first reflective layer 7 was set to be 10 nm. The thickness of the optical interference layers was determined, which allows higher variation in the quantity of reflected light in the recording layer between a crystal state and an amorphous state and the highest light absorption ratio to be obtained. Optical calculation as to the light absorption ratio in the case of $\lambda 1=450$ nm and the light transmittance in the case of $\lambda 2=400$ nm in the first recording medium 17 was conducted. Table 17 shows the results.

TABLE 17

| Thickness of First Recording Layer | First Recording Medium | | |
|---|---|---|---|
| (nm) | Ac/Aa | Tc (%) | Ta (%) |
| 3 | 1.25 | 70.0 | 65.8 |
| 6 | 1.28 | 62.9 | 57.8 |
| 9 | 1.28 | 56.7 | 53.9 |
| 12 | 1.26 | 49.4 | 48.4 |
| 15 | 1.24 | 42.5 | 43.8 |

From the results, when the thickness of the first recording layer 4 is in the range between 3 nm and 12 nm, the conditions of Ac/Aa≧1.0, Tc≧45% and Ta≧45% are satisfied, but when the thickness is 15 nm, Tc <45% and Ta<45%, which do not satisfy the optical conditions. Therefore, the preferable thickness of the first recording layer 4 is in the range between 3 nm and 12 nm and a further preferable thickness is in the range between 6 nm and 9 nm.

EXAMPLE 14

In the present example, the same optical calculation as in Example 2 was conducted while the thickness of the first reflective layer 7 was varied from 2 nm to 25 nm. The thickness of the first recording layer 4 was set to be 6 nm. The thickness of the optical interference layers was determined, which allows higher variation in quantity of reflected light in the recording layer between a crystal state and an amorphous state and the highest light absorption ratio to be obtained. Optical calculation as to the light absorption ratio in the case of $\lambda 1=450$ nm and the light transmittance in the case of $\lambda 2=400$ nm in the first recording medium 17 was conducted. Table 18 shows the results.

TABLE 18

| Thickness of First Reflective Layer (nm) | First Recording Medium | | |
|---|---|---|---|
| | Ac/Aa | Tc (%) | Ta (%) |
| 2 | 1.21 | 69.9 | 66.8 |
| 5 | 1.23 | 68.4 | 65.1 |
| 10 | 1.28 | 62.9 | 57.8 |
| 15 | 1.32 | 56.1 | 52.2 |
| 20 | 1.35 | 51.3 | 45.2 |
| 25 | 1.37 | 44.6 | 38.5 |

From the results, when the thickness of the first recording layer is in the range between 2 nm and 20 nm, the conditions of Ac/Aa≧1.0, Tc≧45% and Ta≧45% are satisfied, but when the thickness is 25 nm, Tc<45%, which is too low. Therefore, the preferable thickness of the first reflective layer 7 is in the range between 2 nm and 20 nm and the further preferable thickness is in the range between 5 nm and 15 nm.

Descriptions in the above-mentioned examples were directed to the effect of the dual-wavelength recording in the configurations shown in FIGS. 1, 2, and 3. However, the configuration is not limited to them and the same effect can be obtained irrespective of the thickness of the optical interference layers and the presence of the interface layers as long as the relationship between the wavelength λ1 and the wavelength λ2 is satisfied.

The multiwavelength light source of the present invention can generate a plurality of emission wavelengths in a short wavelength range and also can facilitate the setting of the emission wavelengths. As a result, the multiwavelength light source of the present invention can generate the design wavelengths required for the recording and reproduction of a phase change film easily, thus obtaining an optical system for high density recording and reproduction. Furthermore, since emission beams can be emitted from a single emission point, a multiwavelength light source can be used with a simplified optical system, which is an advantage.

The configuration described above in which recording and reproduction are performed simultaneously using two wavelengths also can be applied to recording in two layers. For instance, when using a dual-wavelength light source with wavelengths of 400 nm and 430 nm, in the recording of the first layer, a beam with a wavelength of 430 nm is used as a recording beam and a beam with a wavelength of 400 nm is used as a reproduction beam and vice versa in the case of the second layer. In the configuration, recording is performed while the information of recording pits in recording is fed back. Consequently, the shape of the recording pits can be controlled precisely to reduce recording noise, thus achieving high density recording.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An optical information recording medium, with respect to which recording and reproduction are performed with laser beams from one side, comprising at least two recording layers formed of a phase change material on a substrate, wherein the recording layers include a first recording layer and a second recording layer in the order from the side on which the laser beams are incident, the first recording layer is included in a first recording medium and the second recording layer is included in a second recording medium, when a wavelength of a first laser beam with which recording and reproduction are performed with respect to the first recording medium is indicated as λ1 (nm), a wavelength of a second laser beam with which the second recording medium is recorded and reproduced as λ2 (nm), a light absorptance of the first recording layer in a crystal state as Ac (%), a light absorptance of the first recording layer in an amorphous state as Aa (%), a light transmittance of the first recording medium with the first recording layer being in the crystal state as Tc (%), a light transmittance of the first recording medium with the first recording layer being in the amorphous state as Ta (%), and the relationship between the wavelength λ1 and the wavelength λ2 is expressed by 10≦|λ1−λ2|≦120, the first recording layer has a light absorption ratio Ac/Aa in a predetermined range with respect to the wavelength λ1 and the first recording medium satisfies conditions of Tc≧30 and Ta≧30 with respect to the wavelength λ2, wherein the first recording medium and the second recording medium are separated by a distance in the range between 1 μm and 50 μm, wherein the first recording layer has a thickness of d2 (nm) in a range of 3≦d2≦9, and wherein the first recording medium includes at least the recording layer and a reflective layer formed sequentially on the substrate, and the reflective layer has a thickness d3 (nm) in a rage of 2≦d3≦20.

2. The optical information recording medium according to claim 1, wherein when the relationship between the wavelength λ1 and the wavelength λ2 is expressed by 10≦|λ1−λ2|≦50, the first recording layer has a light absorption ratio Ac/Aa in a predetermined range with respect to the wavelength λ1 and the first recording medium satisfies conditions of Tc≧45 and Ta≧45 with respect to the wavelength λ2.

3. The optical information recording medium according to claim 1, further comprising a protective layer, wherein the second recording medium, the first recording medium, and the protective layer are formed on the substrate sequentially, the protective layer has a thickness d1 (μm) in a range of 30≦d1≦200, and recording and reproduction are performed with the first and second laser beams from a side of the protective layer.

4. The optical information recording medium according to claim 1, wherein the first recording medium formed on a first substrate and the second recording medium formed on a second substrate are bonded to each other.

5. The optical information recording medium according to claim 1, wherein recording and reproduction are performed with a first laser beam and a second laser beam emitted from a multiwavelength light source in which a part of an optical waveguide of a second harmonic generation element and an optical waveguide of a semiconductor laser are optically coupled.

6. The optical information recording medium according to claim 1, wherein the wavelength λ1 (nm) of the first laser beam is in a range of 390≦λ1≦520.

7. The optical information recording medium according to claim 1, wherein a condition of the light absorption ratio Ac/Aa≧1.0 in the first recording layer is satisfied with respect to the wavelength λ1 (nm) of the first laser beam.

8. The optical information recording medium according to claim 1, wherein the first recording layer contains Ge—Sb—Te.

9. The optical information recording medium according to claim 1, wherein the first recording layer contains Ge—Sb—Te—Sn.

10. An optical system, comprising:
a multiwavelength light source, including a plurality of coherent light sources with different wavelengths and an optical waveguide device, the optical waveguide device including a substrate, a plurality of optical waveguides formed in the vicinity of a surface of the substrate, injection parts formed at one end of the optical waveguides, and emission parts formed on the other end of the optical waveguides, the plurality of optical waveguides satisfying phase matching conditions different from one another the emission parts of the plurality of optical waveguides being provided at substantially the same position, and wavelengths of beams from the coherent light sources being converted by the optical waveguide device;
a focusing optical system; and
an optical information recording medium with respect to which recording and reproduction are performed with laser beams from one side, the optical information recording medium including at least two recording layers formed of a phase change material on a substrate, in which the recording layers include a first recording layer and a second recording layer in the order from the side on which the laser beams are incident, the first recording layer is included in a first recording medium and the second recording layer is included in a second recording medium,
when a wavelength of a first laser beam with which recording and reproduction are performed with respect to the first recording medium is indicated as $\lambda 1$ (nm), a wavelength of a second laser beam with which the second recording medium is recorded and reproduced as $\lambda 2$ (nm), a light absorptance of the first recording layer in a crystal state as Ac (%), a light absorptance of the first recording layer in an amorphous state as Aa (%), a light transmittance of the first recording medium with the first recording layer being in the crystal state as Tc (%), a light transmittance of the first recording medium with the first recording layer being in the amorphous state as Ta (%), and the relationship between the wavelength $\lambda 1$ and the wavelength $\lambda 2$ is expressed by $10 \leq |\lambda 1 - \lambda 2| 120$, the first recording layer has a light absorption ratio Ac/Aa in a predetermined range with respect to the wavelength $\lambda 1$ and the first recording medium satisfies conditions of $Tc \geq 30$ and $Ta \geq 30$ with respect to the wavelength $\lambda 2$, and the first recording medium and the second recording medium are separated by a distance in the range between 1 μm and 50 μm,
wherein beams from the multiwavelength light source are focused on the optical information recording medium by the focusing optical system,
wherein the first recording layer has a thickness of d2 (nm) in a range of $3 \leq d2 \leq 9$, and
wherein the first recording medium in the optical information recording medium includes at least the first recording layer and a reflective layer formed sequentially on the substrate, and the reflective layer has a thickness d3 (nm) in a range of $2 \leq d3 \leq 20$.

11. The optical system according to claim 10, wherein in the optical information recording medium, when the relationship between the wavelength $\lambda 1$ and the wavelength $\lambda 2$ is expressed by $10 \leq |\lambda 1 - \lambda 2| \leq 50$, the first recording layer has a light absorption ratio Ac/Aa in a predetermined range with respect to the wavelength $\lambda 1$ and the first recording medium satisfies conditions of $Tc \geq 45$ and $Ta \geq 45$ with respect to the wavelength $\lambda 2$.

12. The optical system according to claim 10, wherein in the optical information recording medium, the second recording medium, the first recording medium, and a protective layer are formed on the substrate sequentially, the protective layer has a thickness d1 (μm) in a range of $30 \leq d1 \leq 200$, and recording and reproduction are performed with the first and second laser beams from a side of the protective layer.

13. The optical system according to claim 10, wherein in the optical information recording medium, the first recording medium formed on a first substrate and the second recording medium formed on a second substrate are bonded to each other.

14. The optical system according to claim 10, wherein in the optical information recording medium, recording and reproduction are performed with the first and second laser beams emitted from the multiwavelength light source in which a part of an optical waveguide of a second harmonic generation element and an optical waveguide of a semiconductor laser are optically coupled.

15. The optical system according to claim 10, wherein the wavelength $\lambda 1$ (nm) of the first laser beam is in a range of $390 \leq \lambda 1 \leq 520$.

16. The optical system according to claim 10, wherein in the optical information recording medium, a condition of the light absorption ratio $Ac/Aa \geq 1.0$ in the first recording layer is satisfied with respect to the wavelength $\lambda 1$ (nm) of the first laser beam.

17. The optical system according to claim 10, wherein the first recording layer in the optical information recording medium contains Ge—Sb—Te.

18. The optical system according to claim 10, wherein the first recording layer in the optical information recording medium contains Ge—Sb—Te—Sn.

19. The optical system according to claim 10, wherein the optical information recording medium is recorded or reproduced simultaneously with beams with a plurality of wavelengths from the multiwavelength light source.

20. The optical system according to claim 10, wherein the optical information recording medium is recorded with at least one beam with a wavelength from the multiwavelength light source and simultaneously information is detected from the optical information recording medium with a beam with another wavelength from the multiwavelength light source.

21. The optical system according to claim 20, wherein based on signals detected by the beam with another wavelength from the multiwavelength light source, intensity of the at least one beam with a wavelength is controlled.

22. The optical system according to claim 20, wherein based on signals detected by the beam with another wavelength from the multiwavelength light source, a focal point on the optical information recording medium of the at least one beam with a wavelength is controlled.

23. The optical system according to claim 20, wherein beams with a plurality of wavelengths from the multiwavelength light source are mixed, with which the optical information recording medium is recorded.

* * * * *

UNITED STATES PATENT AND TRADEMARK OFFICE
CERTIFICATE OF CORRECTION

| | |
|---|---|
| PATENT NO. | : 7,065,035 B1 |
| APPLICATION NO. | : 09/694625 |
| DATED | : June 20, 2006 |
| INVENTOR(S) | : Mizuuchi et al. |

It is certified that error appears in the above-identified patent and that said Letters Patent is hereby corrected as shown below:

Column 36, line 34(claim 1): "rage" should read --range--

Signed and Sealed this

Sixteenth Day of January, 2007

JON W. DUDAS
*Director of the United States Patent and Trademark Office*